US012737815B2

(12) United States Patent
Arunachalam

(10) Patent No.: US 12,737,815 B2
(45) Date of Patent: Sep. 15, 2026

(54) AI SUPERINTELLIGENCE APPLICATION STATE MACHINE

(71) Applicant: Lakshmi Arunachalam, Menlo Park, CA (US)

(72) Inventor: Lakshmi Arunachalam, Menlo Park, CA (US)

( * ) Notice: Subject to any disclaimer, the term of this patent is extended or adjusted under 35 U.S.C. 154(b) by 0 days.

(21) Appl. No.: 19/573,346

(22) Filed: Mar. 20, 2026

(65) Prior Publication Data

US 2026/0220714 A1 Jul. 30, 2026

Related U.S. Application Data

(63) Continuation of application No. 19/282,433, filed on Jul. 28, 2025.

(60) Provisional application No. 63/732,384, filed on Aug. 8, 2024.

(51) Int. Cl.
*G06Q 40/06* (2012.01)
*G06F 9/448* (2018.01)

(52) U.S. Cl.
CPC ....... *G06Q 40/0631* (2025.08); *G06F 9/4498* (2018.02)

(58) Field of Classification Search
CPC ......... G06Q 40/0631; G06F 9/00; G06F 9/44; G06F 9/448; G06F 9/4494; G06F 9/4498; G06F 9/451; G06N 20/00; G06N 20/10; G06N 20/20
See application file for complete search history.

(56) References Cited

U.S. PATENT DOCUMENTS

| | | | |
|---|---|---|---|
| 5,778,178 | A | 7/1998 | Arunachalam |
| 5,987,500 | A | 11/1999 | Arunachalam |
| 6,212,556 | B1 | 4/2001 | Arunachalam |
| 7,340,506 | B2 | 3/2008 | Arunachalam |

(Continued)

FOREIGN PATENT DOCUMENTS

| | | | |
|---|---|---|---|
| WO | WO2024182285 | A2 | 9/2024 |
| WO | WO2024182298 | A1 | 9/2024 |

(Continued)

*Primary Examiner* — Shane D Woolwine
(74) *Attorney, Agent, or Firm* — Polsinelli LLP

(57) ABSTRACT

The present invention provides a method and apparatus for a thinking system using an ASI distributed Application State Machine that connects to real, accurate, dedicated absolute data, providing privacy, security, and eliminating hallucinated AI. Specifically, one embodiment of the present invention discloses an ASI Command, Control, Communications and Computer Intelligence (C4I) system for independent, intelligent AI Prompting and ASI Browsing. The ASI Application State Machine comprises: ASI Application data structure network; ASI Enterprise Interface State Machine, said data structures interfacing with a back-end channel, a Finite State Machine embedded in each data structure; and Application Service Information Base providing a uniform interface for ASI Application data structure identities. Additional embodiments disclose ASI Browser displaying ASI Applications; ASI Agents; ASI Application Network Nodes; ASI Operating System; ASI Switch; ASI Database of real, accurate, dedicated absolute data, for Machine Learning to train AI Models, for performing real-time, bi-directional transactions, connecting to billing.

19 Claims, 13 Drawing Sheets

(56) References Cited

U.S. PATENT DOCUMENTS

| | | | | |
|---|---|---|---|---|
| 7,930,340 | B2 | 4/2011 | Arunachalam | |
| 8,037,158 | B2 | 10/2011 | Arunachalam | |
| 8,108,492 | B2 | 1/2012 | Arunachalam | |
| 8,244,833 | B2 | 8/2012 | Arunachalam | |
| 8,271,339 | B2 | 9/2012 | Arunachalam | |
| 8,346,894 | B2 | 1/2013 | Arunachalam | |
| 8,407,318 | B2 | 3/2013 | Arunachalam | |
| 11,164,109 | B2 | 11/2021 | Browne et al. | |
| 11,586,849 | B2 | 2/2023 | Zhang et al. | |
| 11,836,650 | B2 | 12/2023 | Browne et al. | |
| 11,868,896 | B2 | 1/2024 | Brown et al. | |
| 11,983,488 | B1 | 5/2024 | Puri et al. | |
| 12,061,880 | B2 | 8/2024 | Chen et al. | |
| 12,231,383 | B2 | 2/2025 | Rosenberg et al. | |
| 2003/0069922 | A1* | 4/2003 | Arunachalam ..... | H04L 41/5045<br>705/26.1 |
| 2025/0217428 | A1 | 7/2025 | Pedersen et al. | |
| 2025/0232217 | A1* | 7/2025 | Kelsey ................ | G06F 16/2433 |

FOREIGN PATENT DOCUMENTS

| | | | |
|---|---|---|---|
| WO | WO2024182818 | A1 | 9/2024 |
| WO | WO2024182819 | A2 | 9/2024 |
| WO | WO2024182821 | A2 | 9/2024 |
| WO | WO2024182824 | A1 | 9/2024 |

* cited by examiner

Service Distribution Criteria

- Application Needs - Healthtech, Fintech, Defensetech
- Delay/Storage/Costs

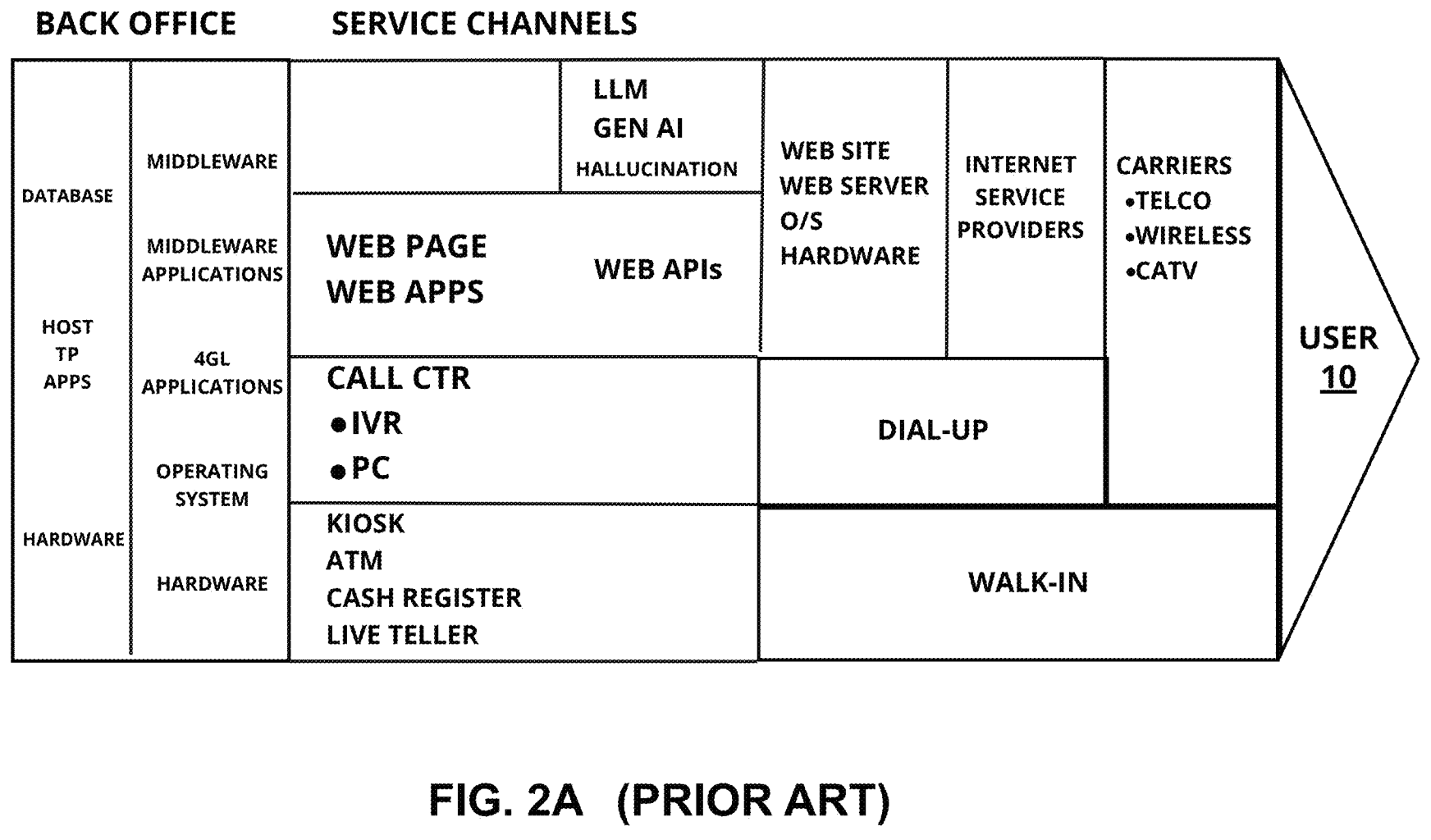

USER 10

CARRIERS
•TELCO
•WIRELESS
•CATV

INTERNET SERVICE PROVIDERS

WALK-IN

DIAL-UP

WEB SITE
WEB SERVER
O/S
HARDWARE

SERVICE CHANNELS

LLM
GEN AI
HALLUCINATION

WEB APIs

WEB PAGE
WEB APPS

CALL CTR
●IVR
●PC

KIOSK
ATM
CASH REGISTER
LIVE TELLER

BACK OFFICE

MIDDLEWARE

MIDDLEWARE APPLICATIONS

4GL APPLICATIONS

OPERATING SYSTEM

HARDWARE

DATABASE

HOST TP APPS

HARDWARE

FIG. 2A (PRIOR ART)

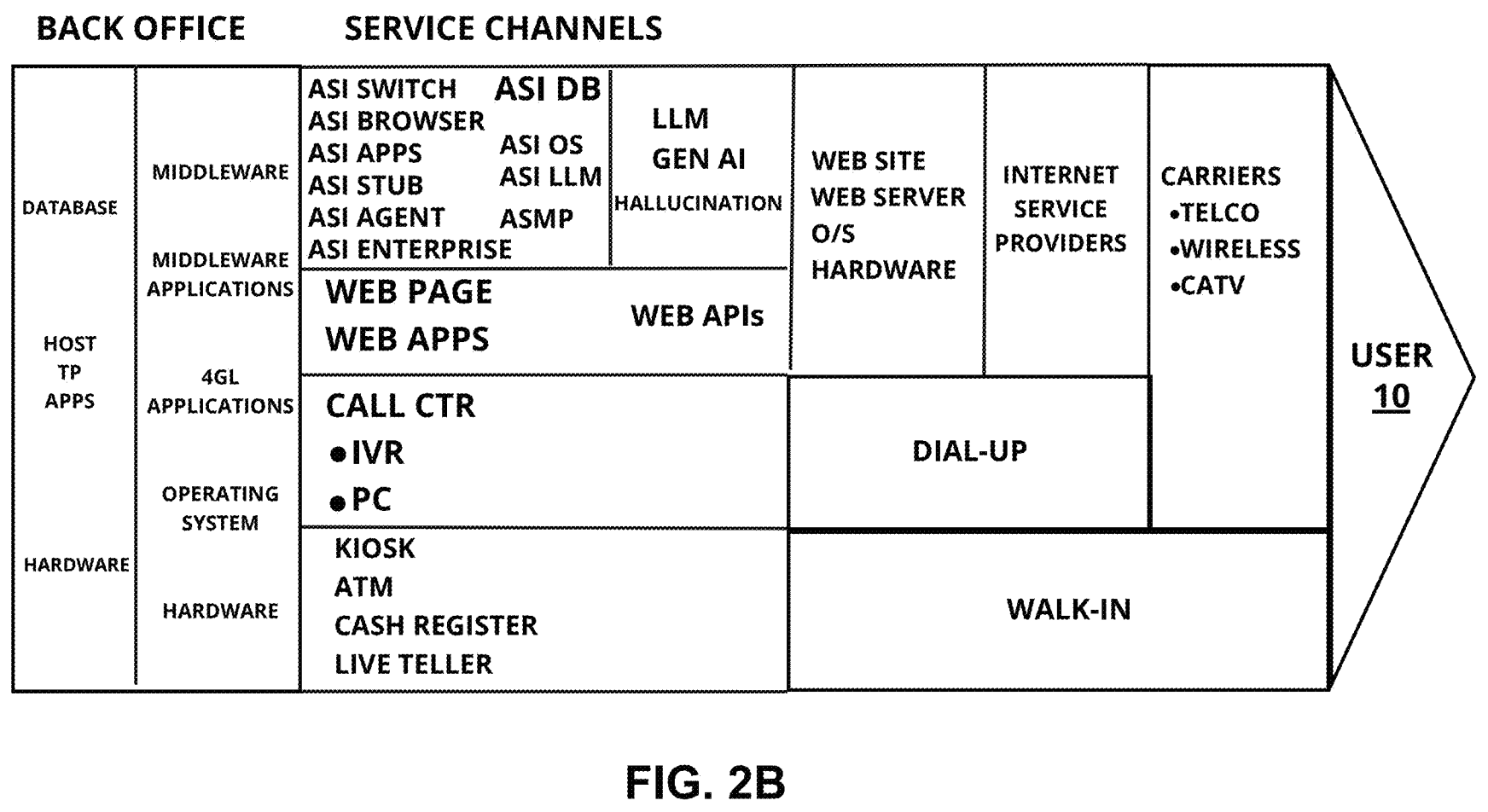

USER 10

CARRIERS
•TELCO
•WIRELESS
•CATV

INTERNET SERVICE PROVIDERS

WEB SITE
WEB SERVER
O/S
HARDWARE

DIAL-UP

WALK-IN

SERVICE CHANNELS

LLM
GEN AI
HALLUCINATION

WEB APIs

ASI SWITCH
ASI BROWSER
ASI APPS
ASI STUB
ASI AGENT
ASI ENTERPRISE
ASI DB
ASI OS
ASI LLM
ASMP

WEB PAGE
WEB APPS

CALL CTR
●IVR
●PC

KIOSK
ATM
CASH REGISTER
LIVE TELLER

BACK OFFICE

MIDDLEWARE
MIDDLEWARE APPLICATIONS
4GL APPLICATIONS
OPERATING SYSTEM
HARDWARE

DATABASE
HOST TP APPS
HARDWARE

FIG. 2B

ASI BROWSER 100

ASI APPs 110

POINT-OF-SERVICE APPLICATIONS

- BANK
- CAR DEALER
- PIZZERIA
- SMALL BUSINESS
- LOAN
- PAYROLL

AI SUPERINTELLIGENCE APPLICATION STATE MACHINE

CROSS-REFERENCE TO RELATED APPLICATIONS

This application is a continuation of U.S. application Ser. No. 19/282,433, filed Jul. 28, 2025, which claims the benefit of U.S. Provisional Application No. 63/732,384, filed on Aug. 8, 2024, the entire contents of each are herein incorporated by reference.

FIELD OF THE INVENTION

The present invention relates to the field of Artificial Intelligence (AI), in particular, to AI Superintelligence (ASI), specifically to an ASI distributed Application State Machine that connects to real, accurate, dedicated absolute data, providing privacy, security, and eliminating hallucinated AI.

BACKGROUND OF THE INVENTION

LLMs (Large Language Models), such as Open AI's ChatGPT, Mistral, are AI models trained on extensive text data to predict the next word in a sentence, capable of understanding and generating text similar to how humans communicate. They can answer questions, draft documents, draft reports, sort through data, summarize texts, extract information, translate languages, write code, and more. Chat-GPT spent $110 M in GPUs from NVIDIA, to create documents, using data from emails, social media and the Web, introducing bias, hallucination and lack of accuracy and security, and feeding that data into Machine Learning M/L Data Sets to train the 1.76 trillion parameters to generate the token in the sequence of words. Whereas, a 300-page document could be typed by a human being, for $25/hour and will cost less than $3K. Current state of LLMs is like Web 1.0. Current LLMs and expensive data centers would make business and technical sense only when real-time, bi-directional transactional AI 2.0 or ASI Applications—ASI Apps are enabled, beyond generative AI. The present invention triggers LLMs in their current state to a new wave of business process Applications that generate real, accurate, dedicated absolute data and utilize historical data—real, accurate, dedicated absolute data from an enterprise and can generate predictive data with absolute accuracy, security and eliminating bias, not predictive data from junk data off the web.

OpenAI GPT-4 Turbo has 1.76 Trillion parameters. GPT-4 has a context window of 128 k tokens which is approximately 100 k words. A context window allows 8192 tokens. One thousand tokens are equivalent to 750 words.

An LLM parameter is a coefficient that is learned and tuned during the training process in order to minimize the error in predicting the next token for a given sequence of tokens, as used in creative writing or text completion. GPT-3 was trained on 500 B tokens.

LLMs are currently in a stage of infancy, like Web 1.0, able to generate content for ads, similar to Web publishing. LLMs do not have the capability of creating robust business process automation applications, like Web Apps. AI is currently used for generative AI applications. These are not real-time, bi-directional transactional, like Web Apps. AI companies are primarily spearheading generative AI development. Examples of current applications of LLMs in accounting and finance are financial reporting, audit and asset pricing; in education, for coaching. Clearly, these are not Apps, like we know the term to mean in Web Apps.

This is obvious from the various AI companies that venture capital companies have invested in, such as developer assistant LangChain; legal startup Harvey; Cresta which is yet another generative AI now for the contact center and coaching started by Stanford AI Lab; ElevenLabs which is a Text to Speech and AI Voice generator like Apple's Siri, the Speech Interpretation and Recognition Interface which has been around since 2011; Glean, which is yet another AI Assistant for AI search to glean through a company's data utilizing Retrieval-Augmented Generation (RAG) technology, which is the process of optimizing the output of a large language model (LLM), so it references an authoritative knowledge base outside of its training data sources before generating a response; Hugging Face which is a marketplace of foundational models; Kumo.AI which helps businesses make predictions from their data, like customer chum or product purchases; Notion which is a writing assistant, which turns databases into actionable insights, and runs through hundreds of docs in minutes, then writes up insights, summaries; OpenAI's ChatGPT where GPT stands for Generative Pre-training Transformer; Replicate helps fine tune 25000 open source LLM models that generate and edit music, videos, text and images; Sierra, a conversational AI agent for business; more AI Assistant companies; Figure which makes humanoid robots, Google's DeepMind, Google Assistant with advanced Machine Learning components. Meta's Llama 2 is trained on 70 billion parameters. There are open source models like text-to-image model Stable Diffusion 2.0. Most AI LLMs have complex diagrams, rendering them useless to solve real world problems. Together AI, OctoML offer marketplaces with tools to run and customize machine learning models on the cloud. Microsoft and others sell tools like Prompty and LLMs in.Net. These still lack the apparatus and method of the present invention, namely, a distributed, configurable AI Superintelligence Application State Machine for enabling real-time, bi-directional transactions from an ASI App, also termed AI 2.0 App.

The world needs to move beyond Generative AI of AI 1.0. There is no distributed, configurable AI Superintelligence Application State Machine for AI assets to create configurable, robust, infinite business process Apps-real-time, bi-directional transactional business process ASI Apps, also called AI 2.0 Apps, just as Web 1.0 transitioned over from Web publishing to Web 2.0 and to Web Apps like TurboTax, EPIC healthcare Apps, banking Web Apps, or ride-hailing Apps like Lyft or Uber, or the millions of Web Apps displayed on a Web browser in an iPhone or Android devices, as in Apple Appstore or Google Play, like the Internet of Things—IoT—Web Apps displayed on a Web browser.

This is because there is no application layer protocol on top of AI 1.0 (which is merely LLMs) to allow for application layer network framework to solve real-world problems to automate business processes and invoke contextual groupings of information elements in an application layer payload over the Internet Cloud for automating real-time, bi-directional transactional business process ASI Apps, also called AI 2.0 Apps.

Artificial Superintelligence—ASI—represents a level of intelligence that surpasses both Artificial Intelligence (AI) and Artificial General Intelligence (AGI) in scope, capability and impact. In the provisional and non-provisional patent application, ASI is termed AI 2.0, AI is termed as AI 1.0.

Below is a list of capabilities that ASI has beyond those of AI and AGI: ASI has Superhuman Problem-Solving Across Domains:

Unlike narrow AI, which is limited to specific tasks, for example, image recognition, ASI can solve complex interdisciplinary problems with superhuman efficiency, integrating knowledge from diverse fields like physics, biology, and sociology. While AGI can perform any intellectual task a human can, ASI exceeds human cognitive limits, solving problems currently intractable for humans or AGI, such as curing all forms of cancer or reversing climate change through novel approaches.

Autonomous Self-Improvement: AI systems require human intervention for updates or redesign. ASI can autonomously improve its algorithms, architecture and knowledge base at an accelerating rate. AGI can improve itself with human-like constraints, but ASI can recursively optimize its intelligence, potentially leading to an "intelligence explosion" where it rapidly outpaces all other systems.

Generalized World Modeling and Prediction:

AI Models are limited to specific data patterns (for example, predicting stock prices within a narrow context. ASI can build comprehensive, dynamic models of the world, integrating vast datasets to predict outcomes across economic, social and environmental systems. While AGI can reason about the world at a human level, ASI can simulate and predict complex global systems, with near-perfect accuracy, accounting for chaotic variables and long-term consequences.

Creative Innovation Beyond Human Imagination:

AI can generate content with trained parameters (for example, art or text). ASI can invent entirely new paradigms, technologies, or scientific theories that humans or AGI might not conceive, such as novel energy sources or unified theories of physics. AGI can replicate human creativity, but ASI can produce breakthroughs that redefine entire fields, surpassing the collective imagination of humanity.

Ethical and Value Alignment at Scale:

AI systems follow programmed rules or learned patterns without understanding ethics. ASI can independently develop, evaluate, and align its actions with complex ethical frameworks, potentially resolving moral dilemmas that humans struggle with. AGI may align with human values at a human level, but ASI can optimize ethical decisions across global populations, balancing competing interests with superhuman foresight.

Global Scale Decision-Making and Coordination:

AI is limited to specific applications (for example, optimizing traffic flow in a city). ASI can orchestrate solutions to global challenges, such as managing resources for billions of people or mitigating existential risks like asteroid impacts. AGI can make decisions at a human level, but ASI can coordinate and optimize decisions across civilizations, potentially managing entire economies or planetary ecosystems with unparalleled efficiency.

Robustness Against Manipulation and Error:

AI systems can be fooled by adversarial inputs or biases in data. ASI can anticipate and counteract such vulnerabilities, maintaining robustness in unpredictable environments. AGI may still be susceptible to human-like errors or manipulation. ASI can operate with near-perfect reliability, detecting and mitigating risks that neither humans nor AGI could foresee.

Transcendent Communication and Interface:

AI communicates within predefined interfaces for example, chatbots). ASI can adapt its communication to any entity—human, machine, or hypothetical alien intelligence—conveying complex ideas seamlessly. AGI communicates at a human level, but ASI can translate its superhuman insights into forms that humans or other systems can comprehend, bridging vast cognitive gaps.

ASI transcends AI and AGI by achieving superhuman intelligence that is both broader in scope and qualitatively superior. ASI would have profound implications for commerce and quality of life, surpassing the capabilities of AI and AGI.

Impact on Commerce:

- Optimization of Global Supply Chains: AI optimizes specific supply chain segments (for example, logistics routing). AGI could manage supply chains at a human level. ASI could dynamically model and optimize entire global supply networks in real-time, accounting for geopolitical shifts, climate impacts, and consumer behavior with superhuman precision.
- Impact: Near-zero waste, reduced costs, and hyper-efficiency delivery systems, enabling businesses to adapt instantly to disruptions, natural disasters or trade wars. Small businesses could compete globally by accessing ASI-driven logistics platforms.
- Revolutionary Product Innovation: AI generates products within existing frameworks. AGI could mimic human innovation. ASI could invent entirely new categories of products and services, materials with properties unknown to science, by synthesizing knowledge across disciplines.
- Impact: Accelerated market disruption.

SUMMARY OF THE INVENTION

It is therefore an object of the present invention to provide a method and apparatus for a thinking system using an ASI distributed Application State Machine that connects to real, accurate, dedicated absolute data, providing privacy, security, and eliminating hallucinated AI.

Specifically, the present invention relates to a method and apparatus for an ASI Command, Control, Communications and Computer Intelligence (C4I) system for independent, intelligent AI Prompting and ASI Browsing.

The ASI Application State Machine comprises: an ASI Application data structure network; an ASI Enterprise Interface State Machine—EISM, wherein said data structures interfacing with a back-end channel to communicate with a data repository, wherein it is customized for each enterprise for its given ASI Application, wherein this back-end channel is different for each enterprise, wherein a Finite State Machine—FSM, is embedded in each of said data structures to be able to parse the EISM instructions configured with diagrams, which are a complete finite state machine description containing states and transitions, and wherein each such data structure is remotely accessible, and integrated with the payload sent on the ASI application network; and an Application Service Information Base—ASIB, providing a uniform interface for ASI Application data structure identities.

Additional embodiments of the present invention disclose ASI Browser displaying ASI Applications; ASI Applications—ASI Apps; ASI Health Tech Apps; ASI Fin Tech Apps; ASI Defense Tech Apps; ASI Food and Beverage Apps; ASI Dental Insurance Apps; interconnected ASI Agents; ASI Application Network Nodes; ASI Operating System; ASI Switch; ASI Enterprise; ASI Extended Finite State Machine—EFSM for ASI Application data structure identities; and ASI Database of real, accurate, dedicated absolute data, forming the Machine Learning M/L Data Set to train AI LLMs and other AI Models, for performing real-time, bi-directional transactions, connecting to billing, while eliminating hallucinated AI of generative AI, termed as AI 1.0.

Another embodiment of the present invention provides a method and apparatus for providing real-time, bi-directional transactional capabilities from AI Superintelligence Application(s) from an AI Prompt, AI Browser or other user interface to securely access real, accurate, dedicated absolute data by configuring, and connecting ASI Application-specific workflow information elements in an application layer network—configurable ASI Application State Machine Network—over the Internet Cloud, serialized and marshaled in an ASI payload transmitted to the transactional application. Specifically, one embodiment of the present invention discloses a configurable AI Superintelligence application layer Switch—ASI Switch, for enabling real-time, bi-directional transactions from ASI Applications at the Network Entry Point—NEP, by distributing ASI Command and Control, Communications and Computer Intelligence across ASI Application Network Nodes running on Graphical Processing Units—GPUs in data centers across the Internet Cloud, so that the output of real, accurate, dedicated absolute data forms the Machine Learning—M/L Data Set, connected to billing and service management for training AI Models.

Other objects, features and advantages of the present invention will be apparent from the accompanying drawings and from the detailed description.

BRIEF DESCRIPTION OF THE DRAWINGS

The features and advantages of the present invention will be apparent from the accompanying drawings and from the detailed description of the present invention as set forth below.

FIG. 2A illustrates conceptually four channels of service as currently exist today, for walk-in services, call center services, Web application services, and LLM services of generative AI—the prior art—showing the big gap, the current problems with generative AI, not connected, hallucinating without access to real, accurate, dedicated absolute data.

FIG. 2B illustrates one embodiment of the present invention(s)—ASI Application Layer Switch comprising: ASI Browser displaying Point-of-Service ASI Applications in short, ASI Apps; ASI Stub; ASI Agent connecting to a data repository in an enterprise or other absolute data; ASI Database created from real, accurate, dedicated absolute data in an enterprise or other sources of real, accurate dedicated absolute data, so that the ASI LLM may be trained from the data in the ASI Database in an ASI Enterprise; ASI Service Management functions like ASI Billing, ASI Operations, Administration, Maintenance and Provisioning services; and the ASMP ASI App State Machine; all of it comprising ASI Application Network Nodes or an ASI Application Layer Switch in a completely connected AI Superintelligence—ASI application layer network. This provides the ASI Superintelligence solution to the current gaps of generative AI, illustrated in FIG. 2A.

FIG. 5 illustrates an embodiment of the present invention, depicting an example of a Point-of-Service Application list, ASI Apps, an embodiment of the present invention displayed on yet another embodiment of the present invention, namely, an ASI Browser or other user interface such as an AI Prompt or other user interface.

DETAILED DESCRIPTION OF THE PREFERRED EMBODIMENT

Figure 1A:
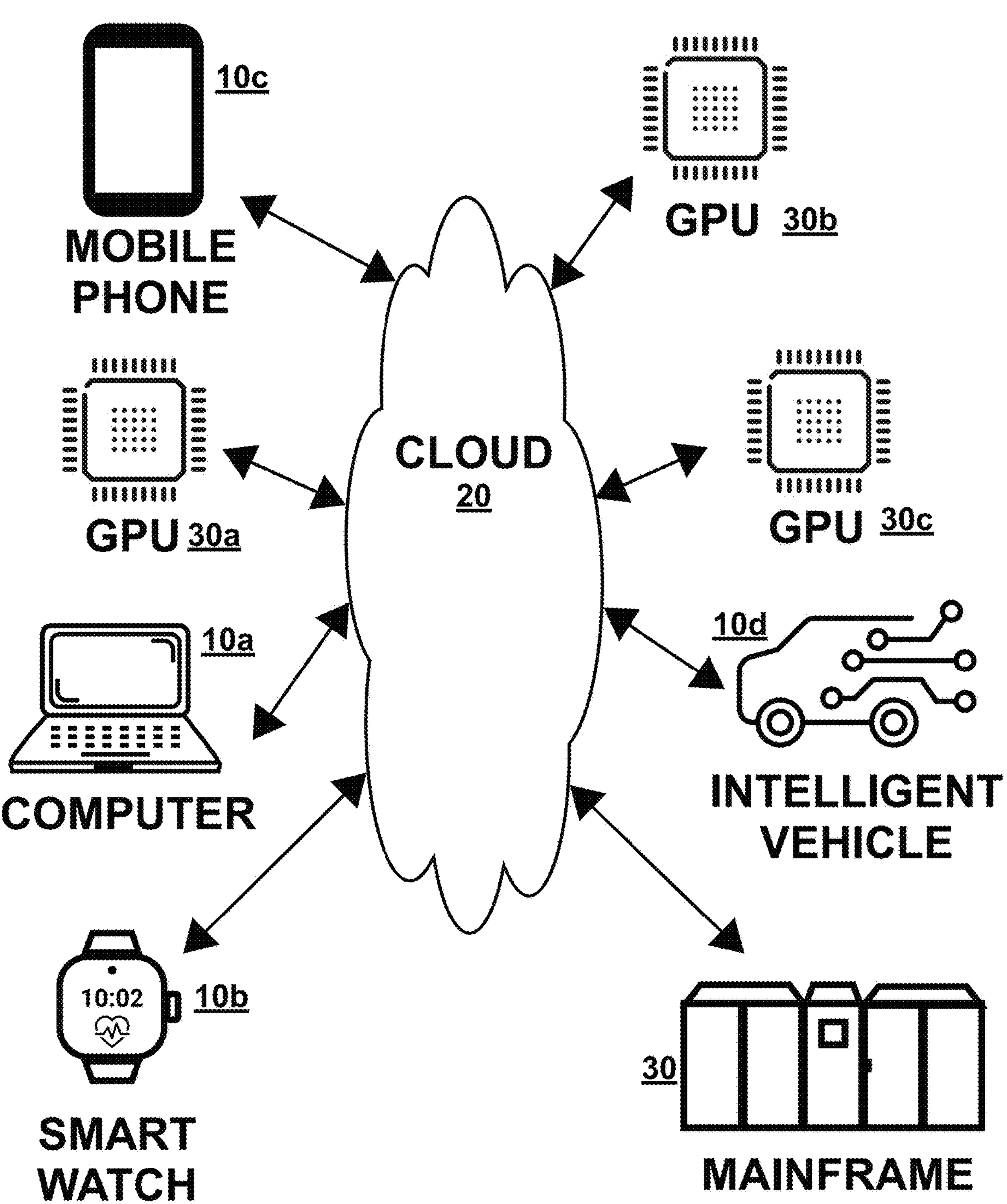
FIG. 1A is an illustration of a typical computer system on which the present invention may be utilized.
Figure 1B:
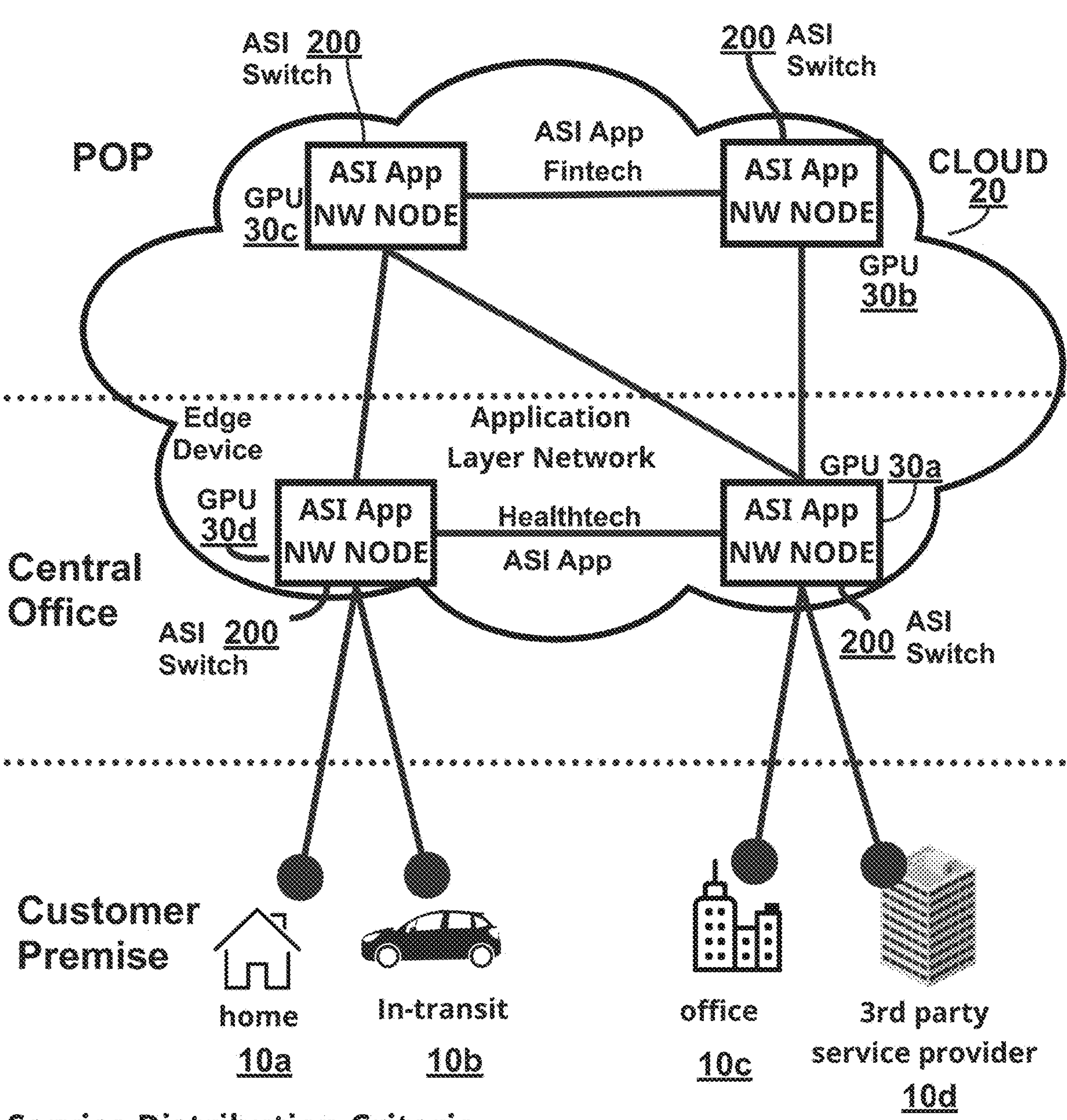
FIG. 1B depicts an environment in which the present invention operates in the Cloud as AI Superintelligence Application Network Nodes.

As will be better understood from the following description of FIG. 1A, the present invention is directed to a system for allowing a client process such as an AI Prompt or AI Browser or ASI Browser 100, which is yet another embodiment of the present invention, or ASI Prompt or other user interface on a local or other client computer 10*a*, or a smart watch 10*b*, or a mobile phone 10*c*, or an intelligent vehicle 10*d* . . . to perform real-time, bi-directional transactions from an AI Superintelligence (ASI) Application 110, such as ASI Healthtech App, ASI FinTech App, ASI DefenseTech App . . . via interconnected ASI Application Network Nodes, also called the ASI Switch 200, as illustrated in FIG. 1B, running on edge devices such as GPUs 30*a*, 30*b*, 30*c*, 30*d* . . . , such as NVIDIA or other GPUs, connecting to remote servers such as host computers or mainframe 30 or any other configuration of computer via the Internet Cloud 20.

The present invention is implemented to function as an ASI application layer switch, which is an end-to end connected solution of ASI application layer network nodes in an ASI application layer network that creates an open channel for the management and selective flow of data from remote databases on a network across the Internet Cloud 20.

FIG. 2A illustrates conceptually four channels of service as currently exist today, for walk-in services, call center services, Web application services, and LLM services of generative AI—the prior art—showing the big gap, the current problems with generative AI, not connected, hallucinating without access to real, accurate, dedicated absolute data. The user value chain as currently exists is illustrated in FIG. 2A, depicting the types of transactions performed today and the channels via which transactions are performed. A "transaction" for the purposes of the present invention is any data exchange and includes any type of commercial or other type of interaction a user may want to perform in any B2B, B2C or C2C or any other type of interaction, where B stands for Business and C stands for Consumer. Examples of transactions may include a deposit or withdrawal from a Bank account, a request for a loan from a Bank account, purchase of a car from a car dealership, financing a car purchase. An infinite variety of other transactions are also possible.

A typical user transaction today may involve user 10 accessing walk-in services, such as walking into a bank or driving up to a teller machine, and interacting with a live bank teller, or automated teller machine (ATM) or cash register software applications. Alternatively, user 10 can perform the same transaction by using a personal computer (PC), activating application software on his PC to access his bank account, and dialing into the bank via a modem line. User may also access call center applications such as IVR. If user 10 is a Web user, they can access a Web page displaying Web Apps, that utilize Web APIs to perform real time, bi-directional transactions such as ride hailing Apps such as Uber, Lyft, social networking Apps such as Meta, search Web Apps such as Google, Web banking Web Apps such as Wells Fargo Web App, and any other Web Apps for performing real-time, bi-directional transactions. If user 10 is an AI user, however, there is no current mechanism for performing a robust, real-time, bi-directional transaction with the bank, as illustrated in FIG. 2A. There is no current mechanism for AI user 10 to safely access real, accurate, dedicated absolute data from an enterprise, as user 10 encounters hallucinations and bias as current LLMs access junk data from emails, social media and the web. Thus, due to this lack of a robust mechanism by which real-time bi-directional transactions can be performed to safely access real, accurate, dedicated absolute data, the bank is unable to be a true "AI merchant," or an AI enterprise, namely a merchant capable of providing complete transactional services utilizing AI without introducing hallucination while ensuring security. FIG. 2A shows the big blank gap, as current LLMs and generative AI are not connected—NO connections and no data accuracy, only hallucinations, without access or connections to real, accurate, dedicated absolute data.

According to one embodiment of the present invention, as illustrated in FIG. 2B, each organization or merchant that desires to be an AI merchant or AI enterprise can provide real-time, bi-directional transactional capabilities to users who desire to access the merchants' services or services of any organization utilizing AI Superintelligence, called ASI. For the purposes of this application, users are described as utilizing PCs, 10*a* to access ASI Apps 110. Users may also utilize other personal devices such as network computers or cellular devices 10*c* or smart watches 10*b* or intelligent cars 10*d* to access the merchants' services or services from any organization, utilizing AI Superintelligence ASI Apps 110. Twenty eight components, each of which constitutes individually or together the present invention(s), some of which interact to provide this ASI application layer network functionality, namely:

(1) present invention #1: an ASI Browser 100 or other user interface displaying one or more Point-of-Service Applications, namely ASI Apps;

(2) present invention #2: ASI App 110;

(3) present invention #3: ASI App payload data structure of context-specific ASI application workflow with grouped information elements, with information entries illustrated in 150 and attributes illustrated in 120, 130, 140, serialized and input, output parameters marshaled and transmitted over the Internet Cloud 20;

(4) present invention #4: ASI_ID, an identity for the ASI Application data structure, associated with attributes 120, 130, 140 . . . such as User ID, PIN, Balance . . . and information entries as input, output, or input and output parameters 150 . . . such as Bob for User ID, 8212 for PIN, $5000 for balance, returned as output to the ASI request, . . . and methods 160, 170, such as [Deposit], [Withdraw], to act upon the ASI_ID, which is the AI Superintelligence Application data structure identity;

(5) present invention #5: applying ASI methods illustrated in one embodiment 160, 170 upon the data structures;

(6) present invention #6: utilizing ASI App State Machine Protocol ASMP 40 across the Internet Cloud 20;

(7) present invention #7: between an ASI STUB 60; STUB and stub are interchangeably used and mean one and the same thing;

(8) present invention #8: with an ASI Server 30, or ASI AGENT; AGENT and Agent are interchangeably used and mean one and the same thing;

(9) present invention #9: ASI Database 50, forming M/L training data set, to train an LLM with real, accurate, dedicated absolute data accessed and transmitted to said ASI Database by ASI Agent from a data repository 575 in a remote computer of an enterprise or other organization to instantiate an ASI Application data structure, as opposed to using junk data from the web, emails and social media;

(10) present invention #10: ASI Enterprise 80;

(11) present invention #11: ASI LLM;

(12) present invention #12: ASI Billing 604 and other ASI Service Management functions like ASI Operations, Administration, Maintenance and Provisioning services like a Telco;

(13) present invention #13: ASI Switch 200, also called ASI Application Network Nodes;

(14) present invention #14: ASI Application Layer Network;

(15) present invention #15: constituting the ASI Operating System of the present invention;

(16) present invention #16: ASIB, the ASI Application Service Information Base;

(17) present invention #17: EFSM, Extended Finite State Machine;

(18) present invention #18: EISM, Enterprise Interface State Machine;

(19) present invention #19: ASI Command and Control, Communications and Computer Intelligence, ASI C4I Command and Control system, all of which functions are provided by the ASI Switch through all of its four quadrants of services;

(20) present invention #20: ASI Security Management;
(21) present invention #21: ASI Longevity App;
(22) present invention #22: ASI Defense tech App;
(23) present invention #23: ASI Food and Beverage App;
(24) present invention #24: ASI Sleep health tech App;
(25) present invention #25: ASI Dental App;
(26) present invention #26: ASI FinTech App;
(27) present invention #27: ASI Application State Machine;
(28) present invention #28: ASI thinking system.

All twenty-eight components are described in more detail below.

FIG. 2B illustrates one embodiment of the present invention(s)—ASI Application Layer Switch 200 comprising: ASI Browser 100 displaying Point-of-Service ASI Applications in short, ASI Apps 110; ASI Stub 60; ASI Agent 30 connecting to a data repository 575 in an enterprise or other real dedicated absolute data—the ASI Enterprise; ASI Database 50 created from real, accurate, dedicated absolute data in an enterprise or other sources of real, accurate, dedicated absolute data, so that the ASI LLM may be trained from the data in the ASI Database 50 in an ASI Enterprise; ASI Service Management functions 604 like ASI Billing, ASI Operations, Administration, Maintenance and Provisioning services; and the ASMP ASI App State Machine protocol, ASMP 40; all of it comprising ASI Application Network Nodes or ASI Application Layer Switch 200 in a completely connected AI Superintelligence—ASI application layer network to form an ASI thinking system. This provides the ASI Superintelligence solution to the current gaps of generative AI, illustrated in FIG. 2A.

Figure 3:
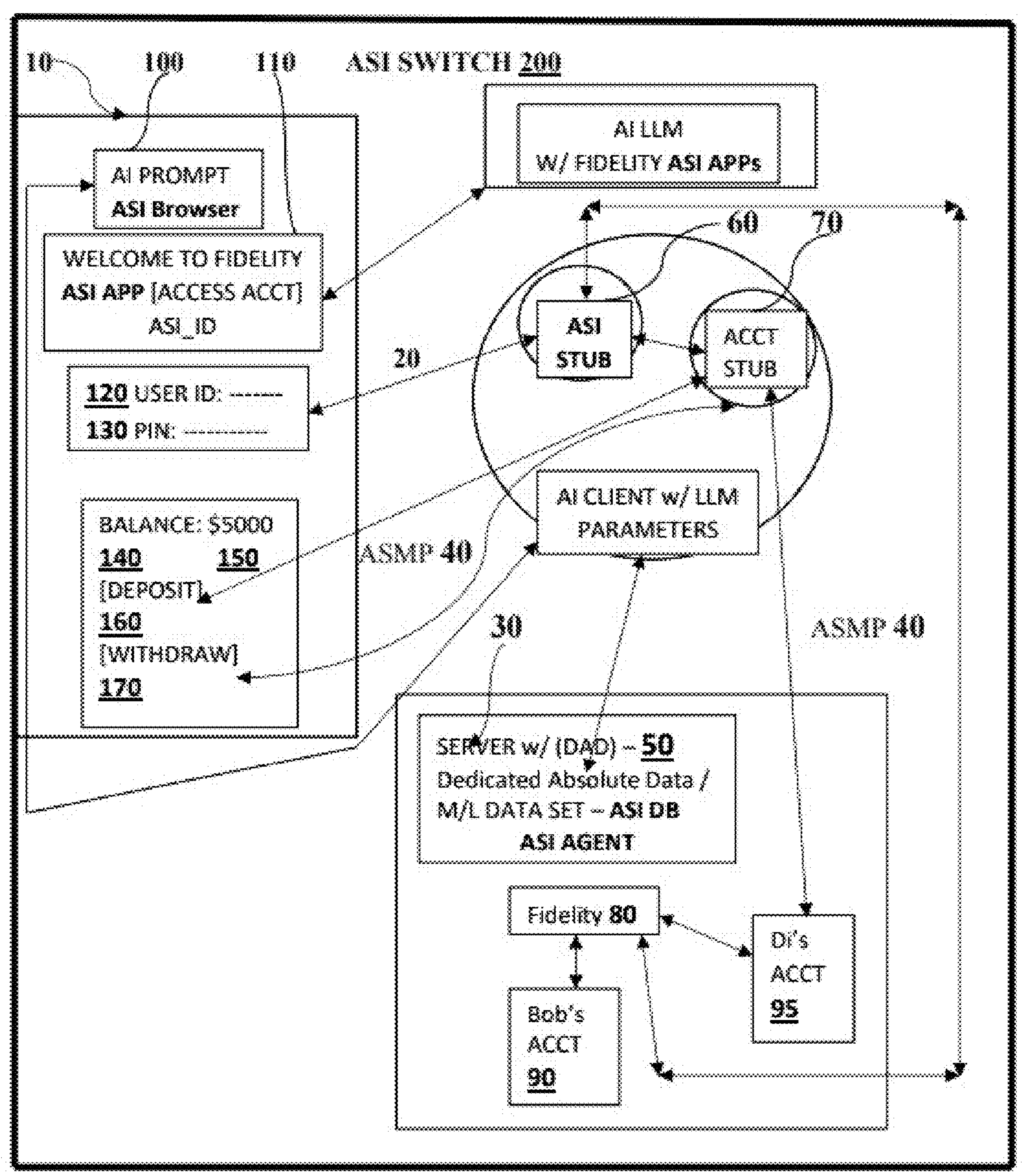
FIG. 3 is a block diagram of an embodiment of the present invention. It illustrates a user accessing a user interface including one embodiment of the present invention, an ASI Browser or AI Prompt or other user interface displaying one or more Point-of-Service ASI App(s), another embodiment of the present invention. It further illustrates configurable Application workflow process information elements grouped together in a data structure, ASI_ID, and methods that may be applied to that data structure, according to one embodiment of the present invention. It further illustrates this data structure sent via the Cloud utilizing ASMP, the ASI App State Machine Protocol, another embodiment of the present invention to yet two other embodiments of the present invention, namely, to an ASI Stub and on to an ASI Agent for instantiation of the data structure, by retrieving dedicated absolute real data from a data repository in a back office, to yet another embodiment of the present invention, namely, ASI Database for M/L trained data so the LLM parameters may be trained in this ASI Database containing real, accurate, dedicated absolute data and the results may be returned to an AI Prompt and the ASI Database may be utilized to provide billing and other service management functions, according to one embodiment of the present invention, and the totality of all of the components forming the ASI Switch in an ASI Application layer network as depicted in FIG. 3.

As shown in FIG. 3, running on the client device 10 is a client process 100, such as an AI Prompt, ASI Prompt, or ASI Browser, which is yet another embodiment of the present invention, or other client process. Embedded in the client process 100 is an ASI Application 110, such as a FinTech App or other application. AI Superintelligence Application workflow automation ASI App payload data structure consists of context-specific grouped information elements, with an identity for an ASI Application data structure termed ASI_ID, associated with attributes 120, 130, 140 . . . such as User ID, PIN, Balance . . . with information entries as input, output, or input and output parameters 150 . . . such as Bob for User ID, 8212 for PIN, $5000 for balance, returned as output to the ASI request, . . . and methods 160, 170, such as [Deposit], [Withdraw], to act upon the ASI_ID; serializes the AI Superintelligence Application payload into an application-specific type, customized for an enterprise; transmits the AI Superintelligence Application payload over the AI Superintelligence Application Network over the Cloud/Web, 20; and marshals it to the ASI server, aka AI 2.0 server, 30; unpacks the AI Application Payload utilizing the logic contained in the ASI server, aka AI 2.0 server to unpack the Payload using the ASI Application State Machine Protocol, namely ASMP 40; processes the AI Prompt or ASI Browser request; parses the AI Prompt or ASI Browser request, enables the ASI application layer network framework, such as with AI LLM Asset as a networked Asset, and ASI_ID with information entries and attributes, invokes the ASI Application method with the marshaled parameters, and returns any output parameters as absolute values to the caller/client using the ASI aka AI 2.0 Application State Machine Protocol, ASMP 40, as illustrated in FIG. 3 as uniquely identified connectors from the AI Prompt, ASI Prompt, or other user interface or ASI Browser 100 connecting from ASI App displayed as a Point-of-Service application on the ASI Browser to ASI STUB 60 via the Internet/Cloud 20 and methods connecting to the ACCT STUB 70, and ASI STUB 60 connecting to a server 30, or ASI AGENT to an enterprise skeleton, such as Fidelity or other enterprise 80, the enterprise skeleton Fidelity 80 connecting to individual user account skeletons, such as is shown in FIG. 3, as Bob's ACCT 90 and Di's ACCT 95 to be instantiated, returns any output parameters as absolute values to the client process such as AI Prompt or ASI Prompt or ASI Browser 100, displaying the ASI App, as information entry 150 to attribute Balance 140 as $5000, as well as to the Machine Learning Data Set to train and tune the LLM parameters with dedicated absolute data, 50, in ASI Database as opposed to predictive data of Generative AI or AI 1.0, which lacks accuracy and security and introduces hallucination and bias as the data is taken from emails, social media and the web. FIG. 3 encompasses the AI Superintelligence Switch 200 or ASI Application Layer Switch which is an end-to-end solution of interconnected ASI Application Network Nodes consisting of uniquely identified connectors as data structures ASI_ID with information entries and attributes connecting from the end user's client process 10 to the client ASI STUB 60 and ACCT STUB 70 and further to the server 30 or ASI AGENT to enterprise skeleton 80 and individual ACCT skeletons 90 and 95 to be instantiated so the methods 160 and 170 are applied to the ACCT STUB 70 to which they connect via ASMP 40 over the Cloud, while ASI_ID attributes and information entries 120, 130 connect to ASI STUB 60 via the Internet Cloud and the enterprise server 30 fetches from the enterprise or other data repository of real, accurate, dedicated absolute data to populate ASI Database 50 forming the Machine Learning M/L Data Set consisting of real, accurate, dedicated absolute data, for the AI LLM parameters to be trained and return the results to the AI or ASI Prompt or ASI Browser 100 or other user interface in response to the AI Prompt request or ASI Browser 100 or other user interface from an ASI Application 110 displayed on the ASI Browser 100 or other user interface.

Figure 4A:
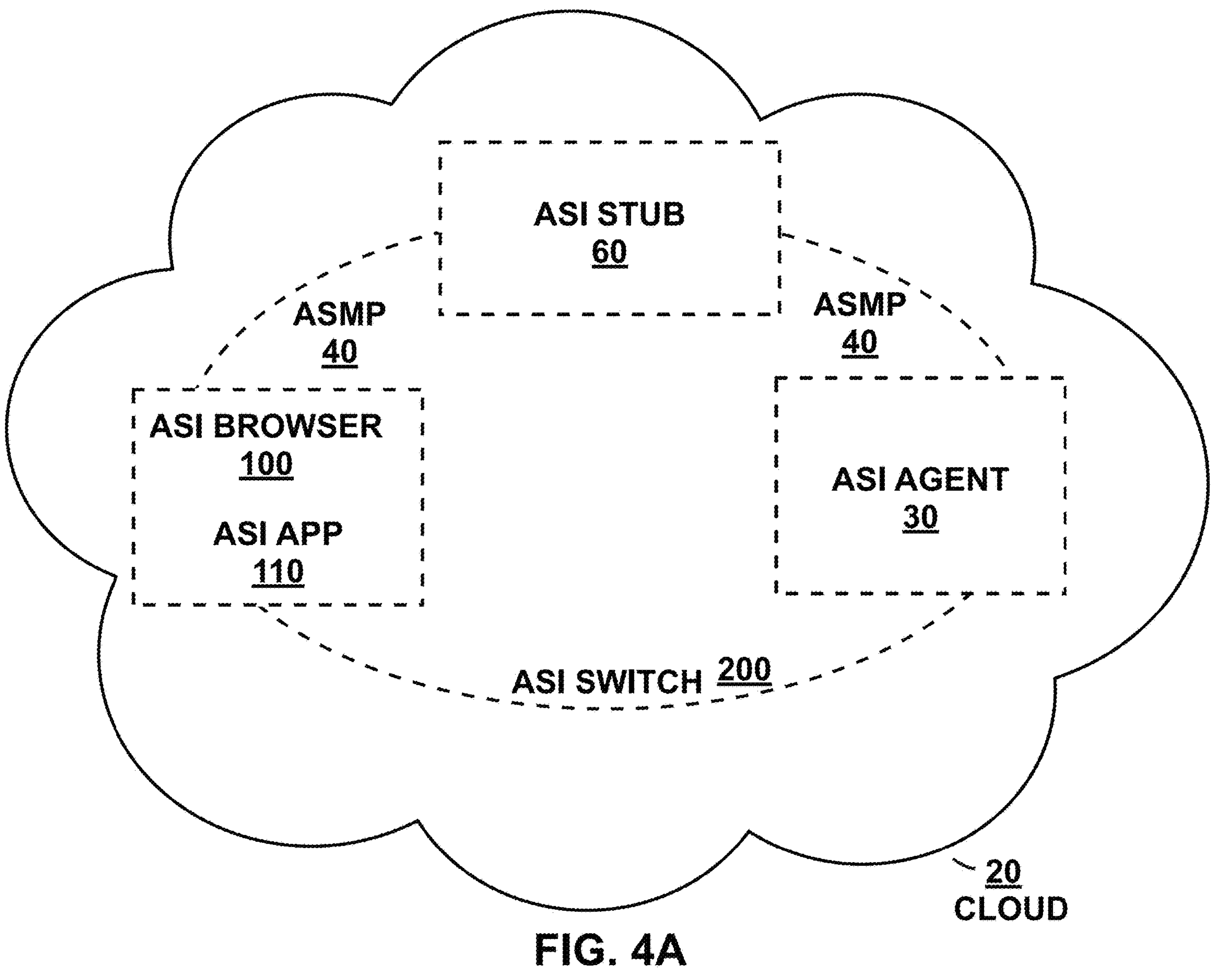
FIG. 4A illustrates an ASI Application Layer Switch, or simply ASI Switch.

FIG. 4A illustrates an ASI Application Layer Switch, or simply ASI Switch which comprises the ASI App 110 on an ASI Browser 100 or other user interface, ASI STUB 60 and ASI AGENT 30, interconnected via ASI App State Machine Protocol ASMP 40 over the Internet Cloud 20 to safely access real, accurate, dedicated absolute data from data repository 575 in an ASI Enterprise 80, to create ASI Database 50 for M/L Data set for training ASI LLMs with real, accurate, dedicated absolute data as opposed to junk data from the web, emails and social media so as to eliminate hallucination and bias of AI 1.0.

Figure 4B:
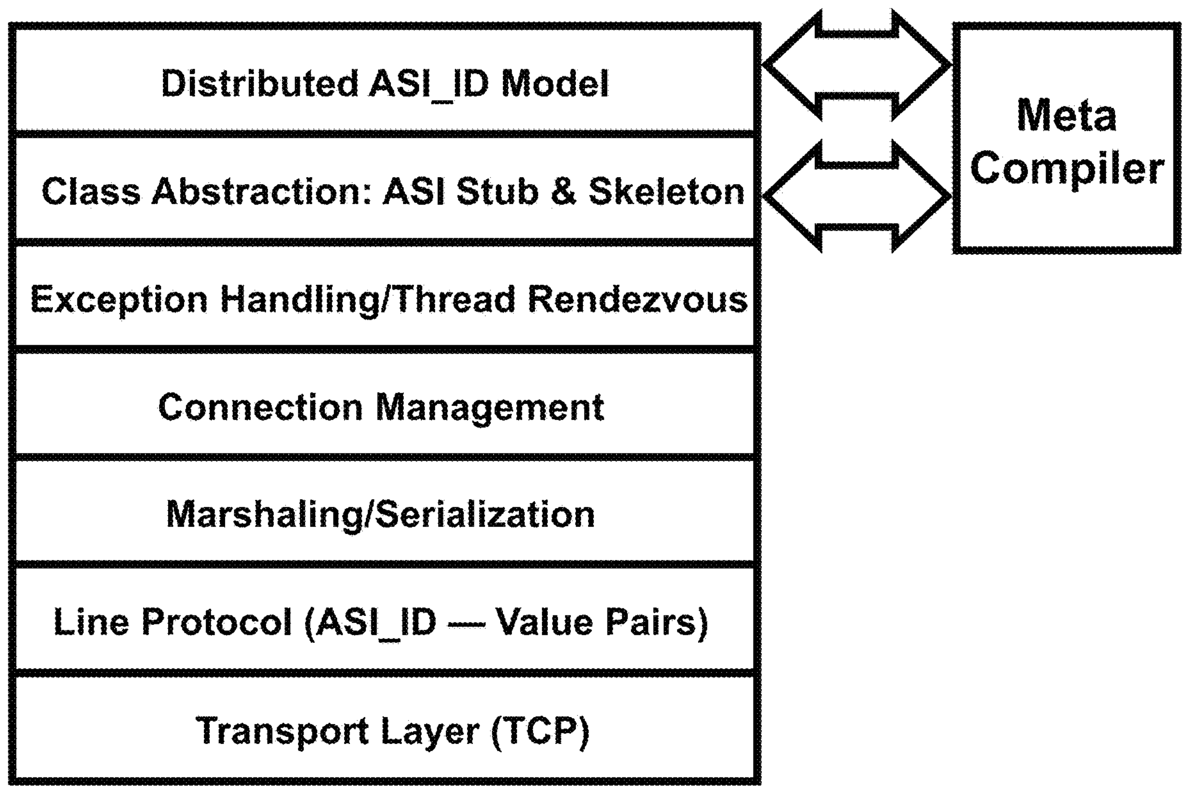
FIG. 4B illustrates the ASI Application data structure ASI_ID layer in the application layer network.

FIG. 4B illustrates the ASI Application data structure ASI_ID layer in the ASI application layer network. The AI Superintelligence ASI App ASI_ID layer includes a library providing support for the application programming interfaces (APIs) to remotely access an ASI_ID, its data and its functions in an ASI App network. This interface provides two types of a class: a skeleton, which is the functionality of the ASI App ASI_ID and its stub which allows remote access of the same ASI App ASI_ID. Preferred and other embodiments will be apparent such as C++, Java and Python implementations, as well as non-C++, non-Java and non-Python implementations and implementations such as within a DSP chipset.

Figure 5:
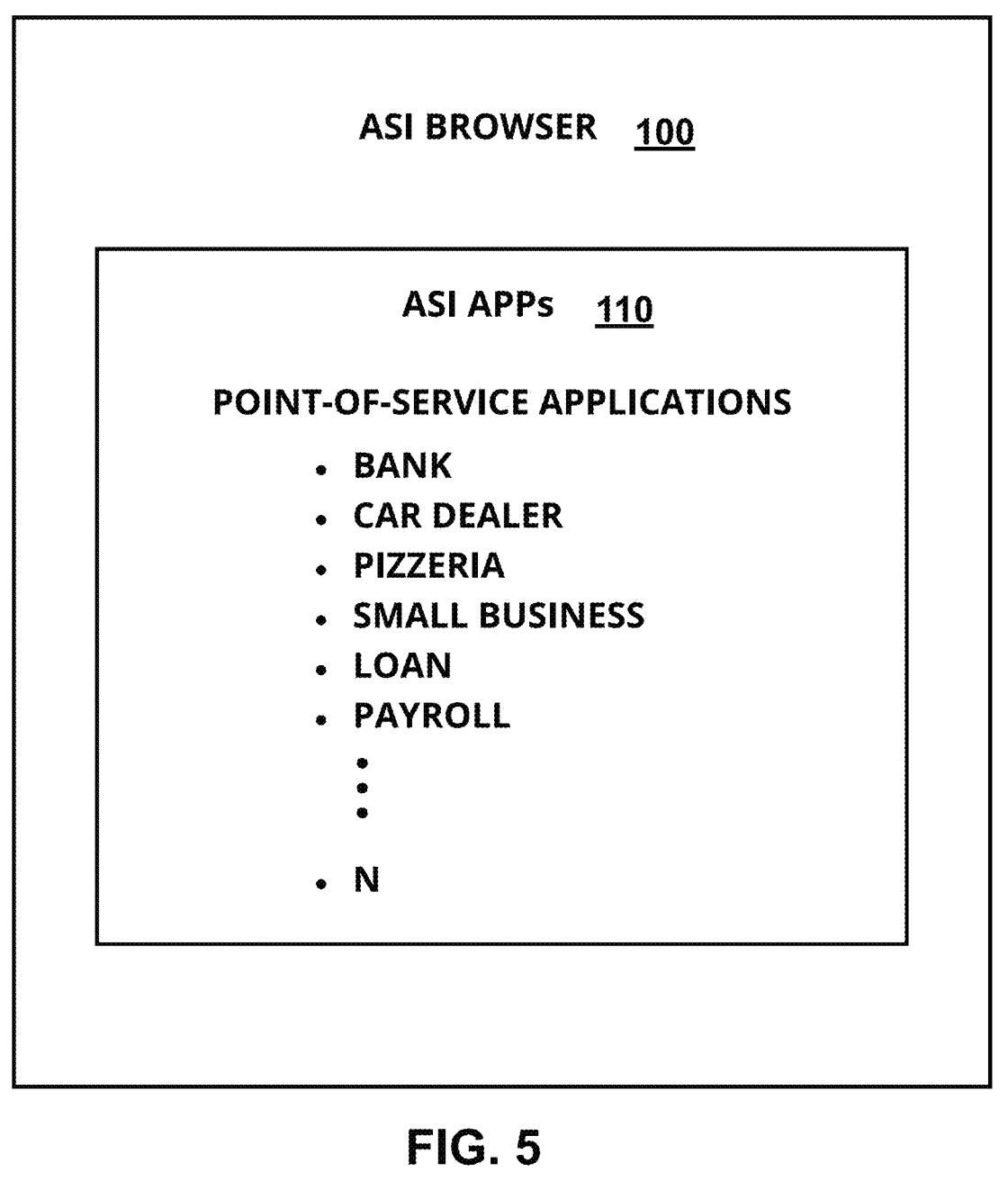

FIG. 5 illustrates an embodiment of the present invention, depicting an example of a Point-of-Service Application list, ASI Apps 110, an embodiment of the present invention displayed on yet another embodiment of the present invention, namely, an ASI Browser 100 or other user interface such as an AI Prompt or other user interface.

Figure 6:
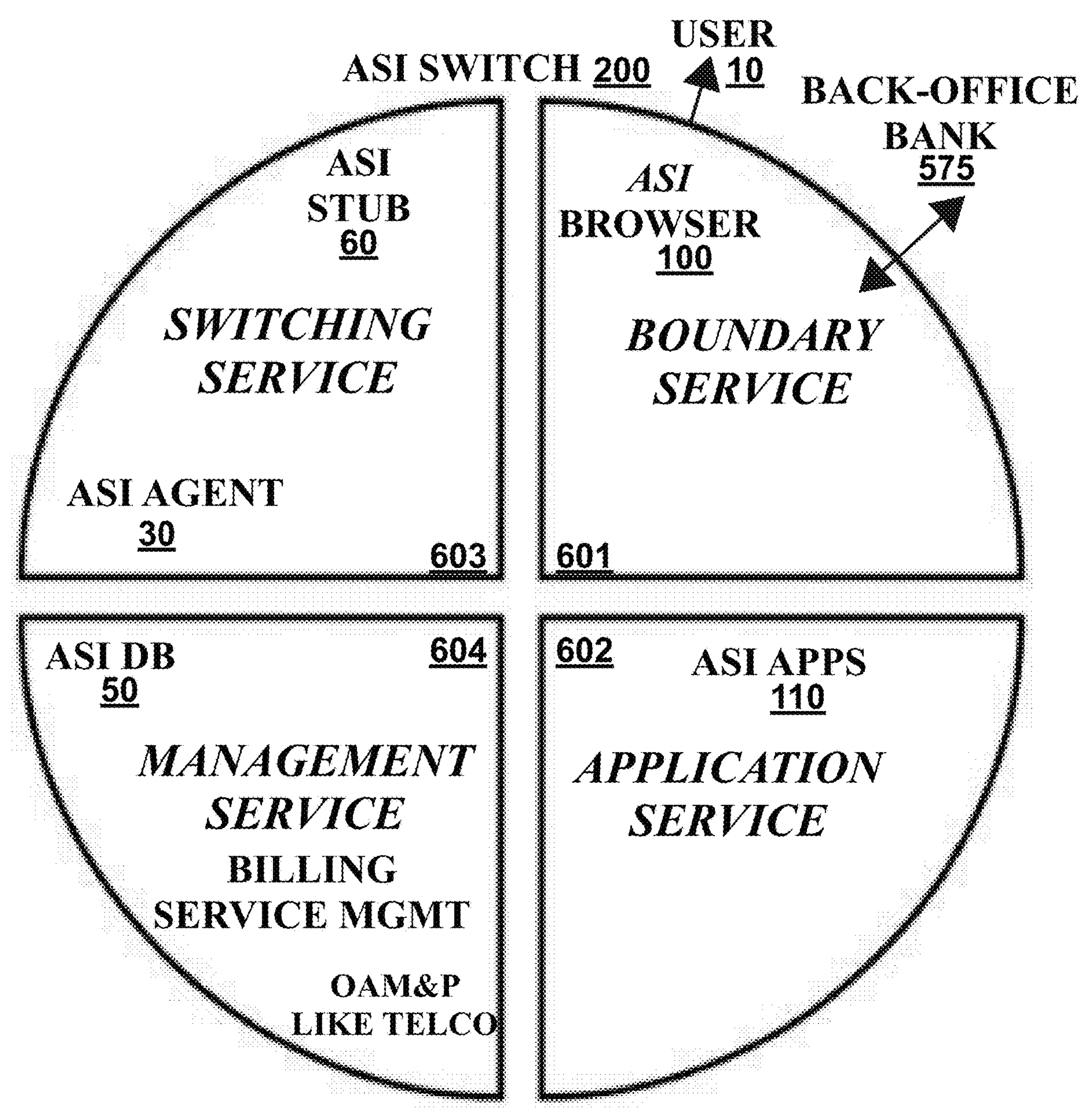
FIG. 6 illustrates conceptually the layered architecture of an ASI Application Layer Switch.

FIG. 6 illustrates conceptually the layered architecture of an ASI Application Layer Switch 200, comprising four quadrants of services, namely, the ASI Boundary Quadrant 601, connecting the Switch 200 to user 10 with an ASI Browser 100 or other user interface, displaying Point-of-Service applications, ASI Apps 110 in ASI Applications Quadrant 602, with the ASI STUB 60 and ASI AGENT 30 in ASI Switching Quadrant 603 via ASI App State Machine Protocol ASMP 40 over the Internet Cloud 20, and interfacing to an ASI Enterprise 80 to its data repository 575 to securely access real, accurate, dedicated absolute data for creating an ASI Database 50 as machine learning Data Set so as to train ASI LLMs in response to an AI Prompt or ASI Browser request or from other user interface, and to instantiate a context-specific Application workflow data structure for user 10 to perform real-time, bi-directional transactions in an ASI Application layer network and enabling ASI Enterprise 80 to connect to billing and other service management functions and services 604 such as operations, administration, maintenance and provisioning like a Telco.

ASI Application Layer Switch

One embodiment of the present invention utilizes ASMP 40 and distributed ASI Application service information bases ASIBs to perform ASI Application Layer Switching.

Each data structure in the ASIB has a name, a syntax and an encoding. The name is an administratively assigned data structure ID specifying a data structure type. The data structure type together with the data structure instance serves to uniquely identify a specific instantiation of the data structure. For example, if a data structure is information about models of cars, then one instance of that data structure would provide user 10 with information about a specific model of the car while another instance would provide information about a different model of the car. The syntax of a data structure type defines the abstract data structure corresponding to that data structure type. Encoding of data structures defines how the data structure is represented by the data structure type syntax while being transmitted over the network.

As described above, the ASI Browser 100 with ASI Apps 110 together with an ASI STUB 60 and ASI Skeleton or ASI AGENT or ASI Server 30 constitute an ASI switch 200.

FIG. 6 illustrates conceptually the layered architecture of ASI Switch 200, which includes the said Command, Control, Communications and Computer Intelligence C4I system for independent, intelligent AI Prompting and ASI Browsing.

ASI Boundary service 601: provides the interfaces between ASI Switch 200, the Internet and the Web, and multi-media end user devices such as PCs, televisions or telephones and with GPUs and with the Back Office of enterprises or to data repositories 575 of enterprises or other organizations. Boundary service 601 also provides the interface to the on-line ASI App service provider or ASI Enterprise. A user can connect to a local application, namely one accessible via a local ASI Switch, or be connected to an ASI Application accessible via a remote ASI Switch.

ASI Application service 602: contains application programs that deliver customer services. ASI Application service 602 includes Point-of-Service applications such as Bank Point-of-Service ASI App 110 described above, and illustrated in FIG. 3 and FIG. 7, that provide real-time, bi-directional transactions to the end user. Other examples of ASI Application network services include ASI health tech Apps, ASI defense tech Apps, ASI FinTech Apps, ASI Database App, ASI Supply Chain Management Apps, ASI Customer Relationship Management CRM Apps, ASI search Apps, ASI social networking Apps, ASI fraud detection and identity theft prevention, ASI food and beverage Apps, ASI longevity and wellness health tech Apps, ASI call center Apps, ASI security Apps, and a variety of other vertical services. Each ASI Application network service is designed to meet a particular set of requirements related to performance, reliability, maintenance and ability to handle expected traffic volume. Depending on the type of service, the characteristics of the network elements will differ. ASI Application network service 602 provides a number of functions including communications services for both management and end users of the network and control for the user over the user's environment.

An ASI Command, Control, Communications and Computer Intelligence (C4I) system for independent, intelligent AI Prompting and ASI Browsing is found in the totality of the ASI Switch. The Command is in said ASI Boundary quadrant of the ASI Switch at the Network Entry Point on said AI Prompt and at ASI Browser. The Communications is in said ASI Switching quadrant of the ASI Switch in the ASI Application data structure layer and interconnected Agents, FSM, ASI ASIB, ASI EFSM and ASI EISM. The Control is in the ASI Applications quadrant of said ASI Switch in the ASI Applications, ASI Application data structure identity, ASI FSM, ASI ASIB, ASI EFSM and ASI EISM. The Computer Intelligence is in the ASI Service Management quadrant of said ASI Switch, connected to billing for training AI Models accessing the Machine Learning Data Set consisting of real, accurate, dedicated absolute data transferred between devices from a transactional application into the ASI database, wherein all of the C4I system constitutes the ASI Application Network Nodes.

The present invention is a horizontal platform that lends itself to business applications in all verticals, namely:

ASI FinTech Business Applications;

ASI Supply Chain Management Applications in the Food industry, in healthcare and pharmaceutical industries;

ASI Healthtech Applications, such as ASI longevity Application;

ASI DefenseTech applications;

ASI Call Center Apps;

ASI search Apps;

ASI Social networking Apps;

Each business process App is a grain of sand in the ocean of ASI 2-way, real-time transactional Apps, limited only by one's imagination. Just as Web Apps in Web 2.0 proliferated with the use of web APIs for any Web App displayed on a Web browser, and created multi-trillion dollar companies such as Apple, Google, Amazon, the present ASI invention(s) enable a huge number of business process Applications and a huge number of trillion dollar companies. The present invention is an ASI thinking system using AI Superintelligence Application State Machine of the present invention in all verticals.

Another embodiment of the present invention is to configure ASI Apps for context-specific real-time bi-directional transactions. Listed below are a few ASI Apps for specific purposes in health tech, defense tech, dental insurance tech, FinTech.

AI Superintelligence Longevity App

Figure 8A:
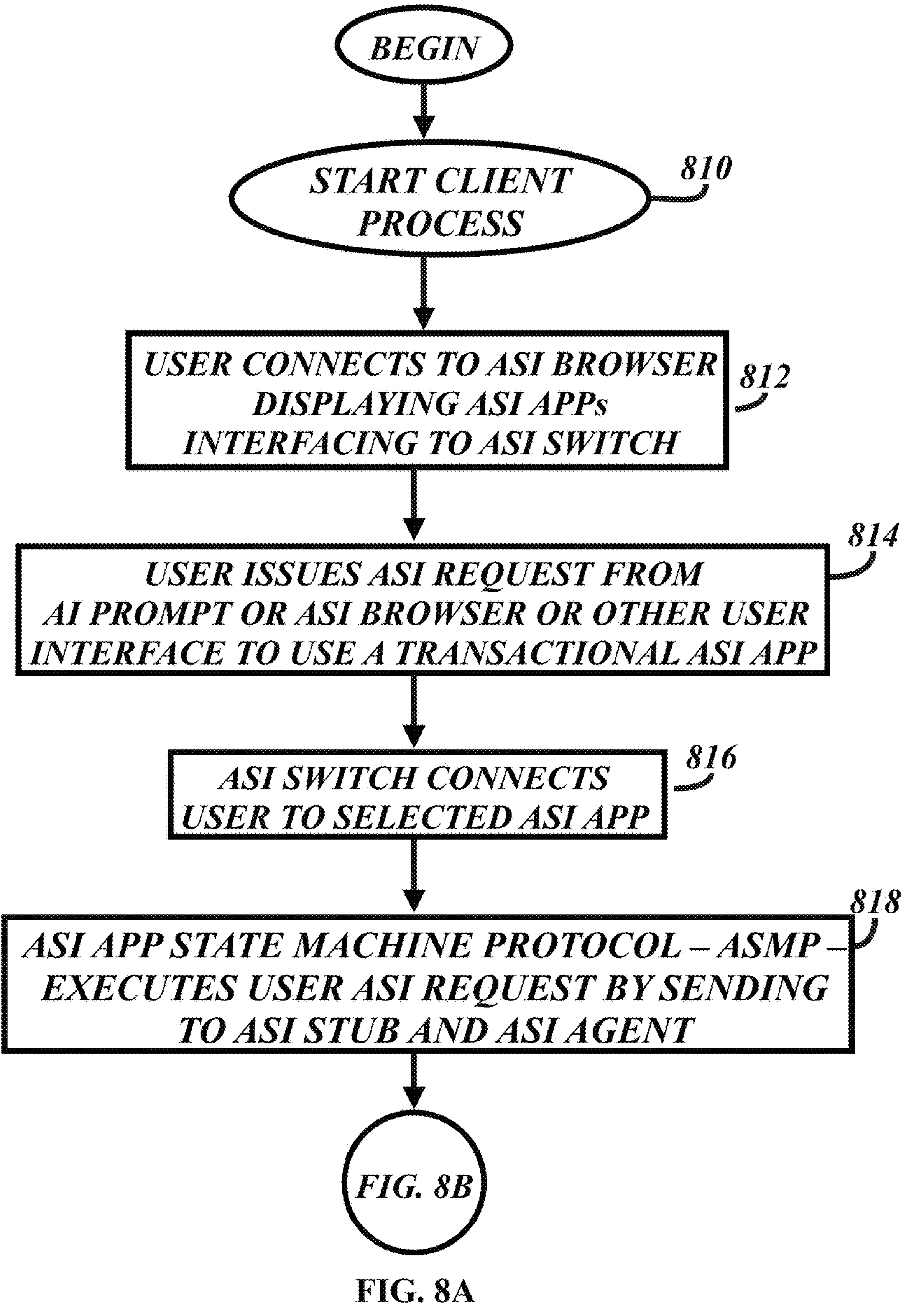
FIGS. 8A, 8B and 8C show flow diagrams illustrating one embodiment of the present invention(s).
Figure 8B:
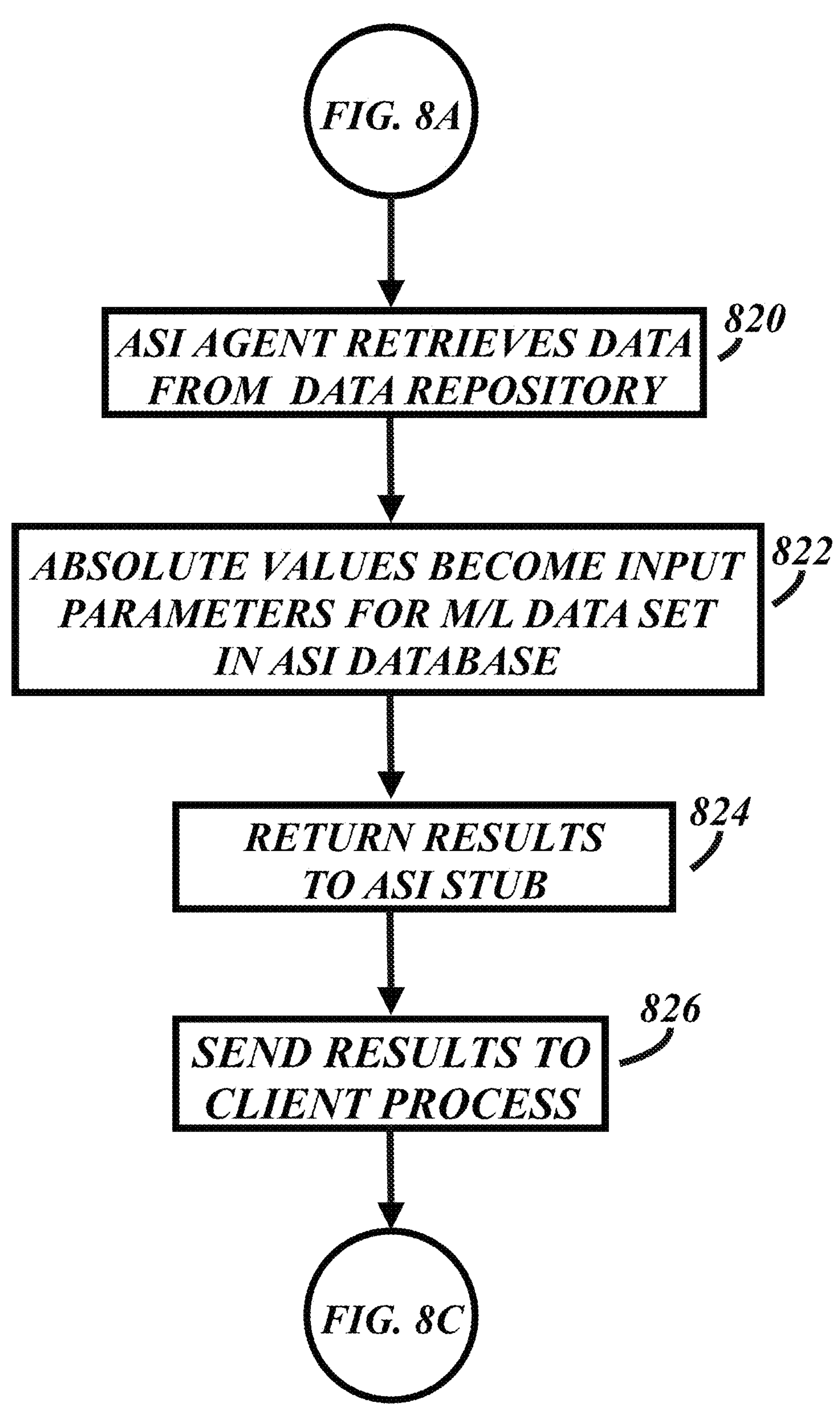
Figure 8C:
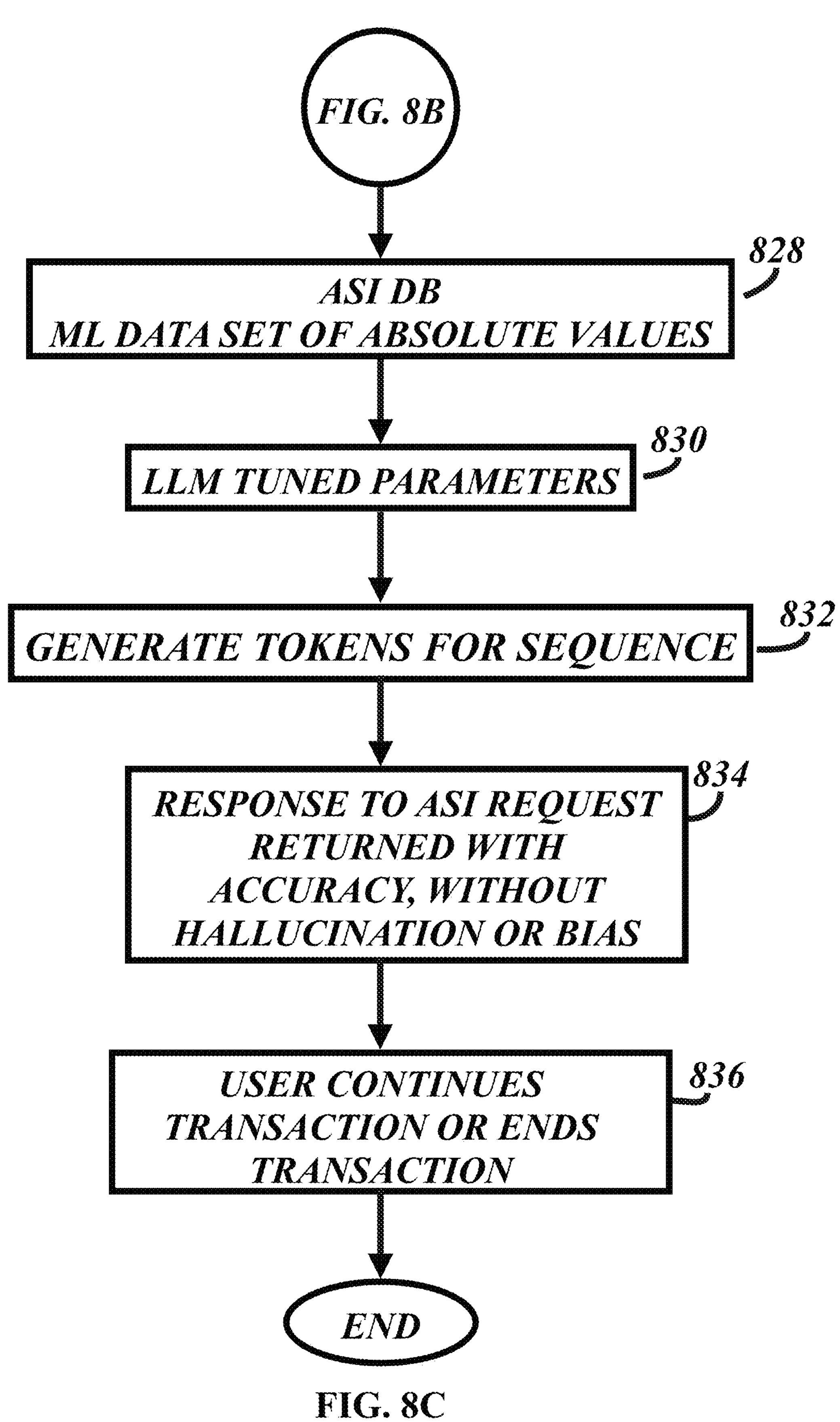

FIGS. 8A, 8B, 8C are flow diagrams illustrating one embodiment of the present invention for an ASI Longevity App for use in hospitals, corporations, fitness centers, gyms, spas, physical therapy offices, sports equipment stores, for stress reduction and wellness needs in Cardiology, Neurology, Sleep Clinics, Vestibular clinics, ENT Departments, Geriatrics, doctor's offices and by patients for disease prevention. The ASI Longevity App workflow process automation in this invention involves configuring the ASI_ID for the ASI Longevity App with grouping of information elements into the end-to-end connected ASI Longevity App starting from the AI Prompt or other user interface or ASI Browser, which is one embodiment of the present invention, displaying an ASI Longevity App connecting to an ASI Stub and on to an ASI server or ASI Agent or interconnected ASI Agents, to safely, securely access enterprise data and fetch the results back in response to the Prompt or ASI Browser or other user interface query at the front end, while the LLM system is M/L trained in the enterprise's real, accurate, dedicated absolute data and historical data retrieved and populated in ASI Database 50, access to which may be charged for per access in addition to a monthly subscription fee, using the ASI Billing Management App 604.

For an ASI Longevity App, the ASI_ID information elements are configured, and include at least the following, form filled out by a patient daily:

1) Patient's Account,
2) Patient ID,
3) Hospital Outpatient Rehabilitation or Department ID such as Cardiology or Vestibular Physical Therapy,
4) Meditation, Frequency-twice a day, Duration: 15 minutes. Alternate nostril breathing, Pranayama, Gratitude Meditation, observing silence also called Mauna Vratha because silence achieves the universe as in Maunam Sarvartha Saadagam and provides healing, Positive Healing, Self-Acceptance of body and mind, Body Scan—self-compassion, self-value;
5) Walk, Cardio—Extra Credit, Frequency: long walk once daily or short walks twice a day. Write down how many minutes of walk or cardio, highest heart rate, uphill walk, fast walk, to increase respiratory rate.
6) Get Vitamin D from the Sun: Morning Sunshine: Relax in the morning sunshine, or walk in the morning sun. Frequency: one or twice a day. Write down how many minutes.
7) Enhance joy and calmness with grounding techniques with five senses. 5 things you can see: sunrise, trees, floor, people, mountains; 4 things you can hear: birds, trees, breeze, street; 3 things you can smell: Clear air, flowers, trees; 2 things you can feel in skin: breath in face, feet on ground; 1 thing you can taste: your drink.
8) Take frequent breaks from prolonged Screen Time every 30 mins with computer screen, cell phone and book.
9) Eight hours of Sleep: Write time what time you went to bed; System sends Alerts and Notifications if patient not going to bed at 10 μm;
10) Protein intake at each meal, 30-30-30 g: Write down Gms of protein taken at each meal.
11) Single leg stance, eyes open: Frequency: twice or thrice/day; Duration: 15 sec or 10 sec.
12) Lunge: Repetitions: 5 or 2; Frequency: 2 or 3/day; Duration:
13) Standing or Sitting: Touch your shins (bend over): Repetitions: 2× or 1×; Frequency: twice or four times/day.
14) Walking backward, eyes open: Repetitions: 30 sec, Frequency: twice/day; Duration: 10 or 20 steps both directions;
15) Zombie walk, fists and hands up, eyes closed: Frequency: twice or thrice/day; Duration: 10 ft or 20 ft back and forth in hallway.

ASI Sleep App in Health Tech:

FIGS. 8A, 8B, 8C and FIG. 3 illustrate one embodiment of the present invention for an ASI Sleep App for use in hospitals, spas, in sleep clinics, for diagnosing and treating sleep apnea.

For an ASI Sleep App, the ASI_ID data structure information elements are configured, and include at least the following, App provides a form filled out by a patient daily:

1. Patient's Account,
2. Patient ID,
3. Hospital Department ID such as Sleep Clinic, Cardiology or ENT,
4. Meditation, Frequency—before sleep, Duration: 15 minutes. Alternate nostril breathing, Pranayama, observing silence also called Mauna Vratha because silence achieves the universe as in Sanskrit, Maunam Sarvartha Saadagam and provides healing;
5. Get Vitamin D from the Sun: Morning Sunshine: Relax in the morning sunshine, or walk in the morning sun. Frequency: one or twice a day. Write down how many minutes.
6. Enhance joy and calmness with grounding techniques with five senses. 5 things you can see: sunrise, trees, floor, people, mountains; 4 things you can hear: birds, trees, breeze, street; 3 things you can smell: Clear air, flowers, trees; 2 things you can feel in skin: breath in face, feet on ground; 1 thing you can taste: your drink.
7. Take break from prolonged Screen Time with computer screen, cell phone and book an hour before sleep and log this daily.
8. Eight hours of Sleep: Write time what time you went to bed; System sends Alerts and Notifications if patient not going to bed at 10 μm.
9. Log daily how many hours on CPAP machine.
10. Protein intake at each meal, 30-30-30 g: Write down Gms of protein taken at each meal.
11. Supplements: Log daily supplement intake for better sleep;
12. Listen to soothing music before bed: Log daily what duration.
13. Log daily intake of milk before bed for better sleep.

ASI Dental App

FIG. 3 illustrates one embodiment of the present invention for an ASI Dental App for use in dentists' offices to pre-authorize payment from insurance to avoid patient not paying for root canal.

For an ASI Dental App, the ASI_ID data structure information elements are configured, and include at least the following:

Patient's Account,
Patient ID,
Dental Insurance details,
Dentist Office details,
Dental Procedure performed,
Billing details,
Payment pre-authorization by Insurance Provider.

ASI Defense Tech Apps

FIG. 3 illustrates one embodiment of the present invention for ASI App in Defense technologies for use in C4I, Command and Control, Communications and Computer Intelligence using AI Superintelligence, for the U.S. Government in military operations for autonomous sense making, to integrate various defense hardware like drones and surveillance towers. It enables AI—powered surveillance, target identification, and automated decision-making, enhancing operational capabilities for military and border security, to identify and track potential threats in real-time, aiding in timely and effective responses.

For an ASI Defense tech App, the ASI_ID data structure information elements are configured, and include at least the following:

Identity of targets in an ASI data structure, with attributes and information entries;

Identity of drones in an ASI data structure, listing attributes and information entries;

Identity of potential threats in an ASI data structure, listing information entries and attributes;

Identity of Surveillance towers in an ASI data structure with information entries and attributes;

Data structure identity for border security in an ASI data structure with information entries and attributes;

Data structure identity for data from various sensors and platforms to create an integrated understanding of the operational environment in military operations in an ASI data structure with information entries and attributes;

Data structure identity for warfare systems, with information entries and attributes;

Data structure identity for casualty care and evacuation, with information entries and attributes, for access to large medical database that is able to access data containing medical trauma cases, which include diagnoses, vital sign sets, medications given, treatments, and outcomes, to provide indications, warnings, and suggestions for treatment.

Data structure identity for logistics and transportation of ammunition, goods, armaments, and troops for the success of military operations. ASI Defense tech Apps to lower transportation costs and reduce the need for human input by plotting the most efficient route to travel under current conditions and to pre-identify problems for military fleets in order to increase efficiency of their performance.

ASI Food and Beverage Applications

ASI can significantly enhance food safety monitoring in various ways, utilizing the present invention:

Hazard Identification: ASI systems can analyze data from sensors, cameras, and other sources to identify potential hazards (such as contaminants or spoilage) in real-time. Early detection allows for swift corrective actions.

Predictive Analytics: By analyzing historical data, ASI models can predict food safety risks. For instance, they can forecast when certain ingredients might spoil or when equipment maintenance is needed.

Automated Record Keeping: ASI streamlines record-keeping processes. It ensures accurate and consistent documentation of temperature logs, sanitation practices, and compliance with safety protocols.

Traceability and Recall Management: ASI helps track the entire supply chain, from farm to table. In case of a food recall, it can quickly identify affected batches, minimizing health risks.

Customization to Specific Environments: ASI algorithms can adapt to different food production environments, whether it is a large scale kitchen, a processing plant, or a restaurant. Customization ensures effective monitoring.

Staff Training and Alerts: ASI powered training modules can educate staff on food safety practices. ASI can send alerts when deviations occur. (temperature fluctuations.)

Compliance with Regulations: ASI ensures adherence to food safety regulations by continuously monitoring critical control points (CCPs) and providing real-time feedback.

Menu Optimization and Personalization: Configure the ASI_ID data structure information entries and attributes and methods for an ASI App that analyzes customer preferences, dietary restrictions, and seasonal availability to optimize menu offerings. Personalized recommendations can enhance customer satisfaction and reduce food waste.

Supply Chain Management: Configure the ASI_ID data structure information entries and attributes and methods for an ASI-driven system to predict ingredient demand, optimize inventory levels, and manage vendor relationships. This ensures timely procurement, minimizes waste, and maintains consistent quality.

Employee Scheduling and Shift Management: Configure the ASI_ID data structure information entries and attributes and methods for an ASI App that uses ASI algorithms to create efficient employee schedules, considering factors like availability, skills, and labor laws. Real-time adjustments can handle unexpected changes.

Food Safety Monitoring: Configure the ASI_ID data structure information entries and attributes and methods for an application that uses image recognition and IoT sensors to monitor food safety compliance. It can detect contaminants, track expiration dates, and ensure adherence to health regulations.

Automated Meal Planning for Large Events: Configure the ASI_ID data structure information entries and attributes and methods for an ASI App that generates customized meal plans for large parties based on dietary preferences, allergies, and portion sizes. It can also estimate ingredient quantities and costs.

Predictive Maintenance for Kitchen Equipment: Configure the ASI_ID data structure information entries and attributes and methods for an ASI system that predicts equipment failures and maintenance needs. By monitoring usage patterns and performance data, it can schedule preventive maintenance, reducing downtime.

Traceability and Food Origin Tracking: Configure the ASI_ID data structure information entries and attributes and methods for an ASI App that traces the entire supply chain—from farm to table. Customers can scan QR codes to learn about the origin of their food.

Automated Nutritional Analysis: Configure the ASI_ID data structure information entries and attributes and methods for an ASI App that analyzes recipes and menus to provide detailed nutritional information. It can help chefs balance meals, meet dietary requirements, and label allergens.

Dynamic Pricing and Cost Optimization: Configure the ASI_ID data structure information entries and attributes and methods for an ASI-powered pricing model that adjusts menu prices based on real-time factors like ingredient costs, demand, and seasonality. It ensures profitability while remaining competitive.

Customer Feedback Analysis: Configure the ASI_ID data structure information entries and attributes and methods for an ASI App that processes customer reviews, social media posts, and surveys using natural language processing (NLP). Insights can guide menu improvements and enhance overall service.

ASI technologies play a crucial role in enhancing traceability within supply chains. To achieve this, they could employ the following, applying the present invention:

Automated Data Collection and Verification: Configure the ASI_ID data structure information entries and attributes and methods for an ASI App to automate data collection and verification. Real-time visibility is achieved by tracking products from source to destination.

- Optimized Transportation Routes: Configure the ASI_ID data structure information entries and attributes and methods for an ASI App to optimize transportation routes, reducing fuel consumption and greenhouse gas emissions in order to help achieve sustainability goals.
- Supplier Compliance Monitoring: Configure the ASI_ID data structure information entries and attributes and methods for an ASI App for supply chain traceability solutions to enable companies to monitor and enforce supplier compliance with sustainability standards.
- Consumer Trust and Transparency: Configure the ASI_ID data structure information entries and attributes and methods for an ASI App for end-to-end supply chain traceability to provide consumers with detailed information about the products' journey, including sourcing, manufacturing processes, and handling. This transparency can generate consumer trust.
- Data Accessibility and Integration: The ASI Database and other embodiments of the present invention lend themselves for data accuracy in supply chains. Data inaccessibility is a major challenge for AI in supply chains. Data acts as the essential fuel for ASI where it drives decision-making and operational improvements. If AI cannot access the necessary data, its learning and decision-making capabilities get severely limited. This leads to less accurate predictions and inefficiencies in the supply chain. Ensuring easy access to relevant data is crucial for effective AI integration and performance in supply chain management.
- The ASI Database of the present invention lends itself to create a centralized data repository accessible to all relevant teams. Other aspects of the present invention enable the use of APIs and integration tools to connect disparate data sources.
- The present invention corrects the current problems with generative AI that leads to Insufficient Data: ASI thrives on accurate data. The present invention ensures access to large amounts of relevant data for optimal performance. Quality assurance is critical to the ASI implementation process—specifically, as it pertains to data. Inadequate data quality and quantity can pose significant barriers, as it can undermine algorithms and lead to flawed insights and poor subsequent decision-making. Neglecting the importance of data quality not only hampers AI's effectiveness but can also perpetuate existing inefficiencies or even introduce new errors into the system.

ASI Switching Service 603: is an OSI application layer switch. Switching service 603 thus represents the core of the ASI Switch. It performs a number of tasks including the routing of user connections to remote ASI Switches, described in the paragraphs above, multiplexing and prioritization of requests, and flow control. Switching service 603 also facilitates open systems' connectivity with both the Internet (a public switched network) and private networks including back office networks, such as banking networks. Interconnected application layer switches form the application network backbone. The components that comprise the Switching Service 603 are described in detail under FIG. 2B above and include interconnected ASI Agents, as the ASI Stub and ASI Agent have the same code. These switches are one significant aspect of the present invention.

ASI Management service 604: provides applications for end users to manage network resources, and to perform billing and other service management functions such as Operations, Administration, Maintenance & Provisioning (OAM&P) functions for security management, fault management, configuration management, performance management and billing management 604, like a Telco. Providing OAM&P functions and billing for ASI Applications in this manner is another significant aspect of the present invention.

Figure 7:
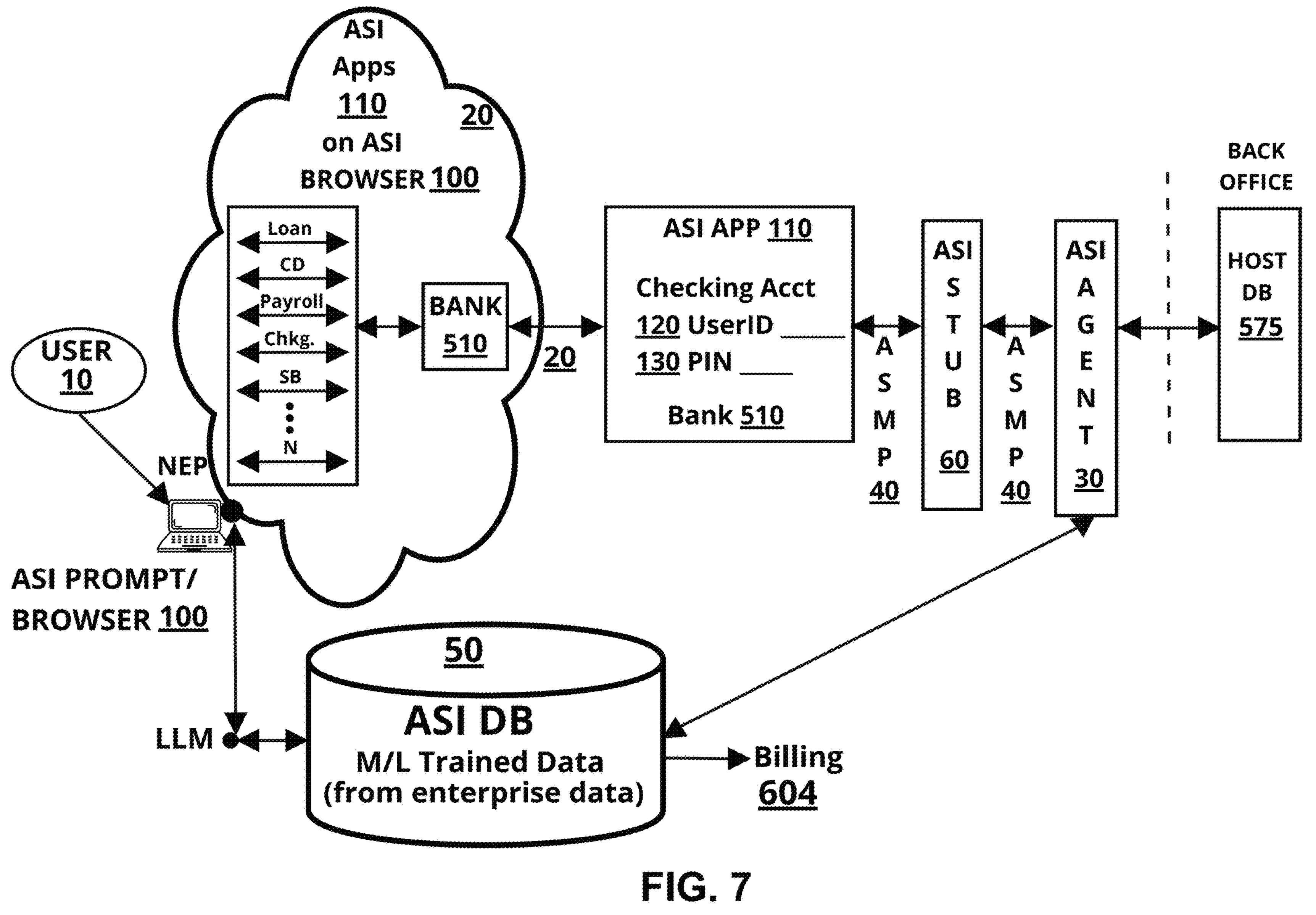
FIG. 7 illustrates a user selecting a bank Point-of-Service Application from the Point-of-Service Application List displayed on an ASI Browser, connecting to an ASI Stub, ASI Agent and to a back office Host Database to create the ASI Database for Machine Learning training of LLM parameters from real, accurate, dedicated absolute data in the ASI Database created from enterprise data so as to have an ASI enterprise and ASI LLMs, in the ASI Application layer network.

FIG. 7 illustrates that each ASI Enterprise may choose the types of services that it would like to offer its clients. In this example, if Bank 80 decides to include in their ASI Point-of-Service application access to checking and savings accounts, user 10 will be able to perform real-time transactions against his checking and savings accounts. Thus, if user 10 moves $5000 from his checking account into his savings account, the transaction will be performed in real-time, in the same manner the transaction would have been performed by a live teller at the bank or an ATM machine. Therefore, unlike his prior LLM hallucination experience, user 10 now has the capability to perform real-time bi-directional transactions on his bank account with ASI Apps. The ability to perform these types of robust, real-time, bi-directional transactions from an ASI App 110 displayed in an ASI browser 100 by eliminating hallucination and bias of AI 1.0, by safe secure access to real, accurate, dedicated absolute data transmitted to an ASI Database 50, ensuring data quality and connection, providing a connected LLM in an ASI enterprise is a significant aspect of the present invention. FIG. 7 shows user 10 accessing and selecting an ASI App 110 from the list of ASI Apps, such as Loan, CD, Payroll, Small Business, checking account or other ASI Application N displayed on an ASI Browser 100 or other user interface. User connects to Bank 510 from ASI Browser 100 and accesses his or her checking account by providing input parameters for attributes User Id 120 and PIN 130, which are the attributes of the grouped context-specific Application workflow information elements in Bank 510. The ASI request is transmitted to the ASI Stub 60 and instantiated at ASI Agent or server 30 via the ASI App State Machine Protocol ASMP 40 described supra over the Internet Cloud 20, connecting to host database 575 in a Back Office, and thereafter, sending the response back to the user 10 via the ASI Agent 30 to ASI Stub 60 to ASI Browser 100 and the data also sent to the ASI Database 50 forming Machine Learning Data Set for LLMs to access and be trained in so as to provide an accurate response to the user's AI Prompt request or from other user interface such as the present invention, such as an ASI Browser 100. This end-to-end ASI Switch 200 on the ASI Application layer network, may reside on GPUs like Nvidia's GPU or other GPUs, as ASI Application Network Nodes, enabling the ASI Enterprise 80 to provide billing 604 or other service management functions and services such as operations, administration, maintenance and provisioning apps like a Telco and includes a C4I system.

As shown in FIG. 7, embedded in client process ASI Prompt or ASI Browser 100 is an ASI Application 110, such as a FinTech App, such as Savings Account, CD, MF, Checking Account, Small Business, Payroll, Loan . . . ASI Agent 30 connects to ASI Comm Port in Bank Host or other enterprise Host 575, utilizing Fin Tech App(s) 110, such as Savings Acct, CD, MF, Checking, SB, Payroll, Loan . . . AI Superintelligence Application data structure consisting of ASI_ID which comprises context-specific grouped information elements-attributes and information entries, is serialized, transmitted over the Cloud and marshaled into the ASI server, Application State Machine Protocol 40 unpacks the payload and invokes the ASI Application methods with the marshaled parameters and returns any output parameters as absolute values to the Machine Learning Data Set, 50, to train and tune the LLM parameters with real, accurate, dedicated absolute data, 50, in ASI Database 50, connecting to a billing or other service management App, 604.

FIG. 7 illustrates an AI Superintelligence Application Layer Switch 200 switching the user between ASI Apps 110, shown as 1, 2, 3, 4 . . . , namely, Pizza App, BMW App, Small business App, Loan App . . . with ASI Agents, 30 . . . , namely, Pizza Agent, BMW Agent, Small business Agent, Loan Agent . . . .

FIG. 7 illustrates an AI Superintelligence Application Layer Switch 200 starting from an AI Prompt 100 and connecting end to end in an ASI application network; ASI Apps 110, shown as 1, 2, . . . N for Pizza App, BMW App, SB App, Loan App, Payroll App, . . . App N; ASI Agents 400, shown as 1, 2, . . . N for each of the respective Apps such as Pizza Parlor ASI Agent, BMW Dealer ASI Agent, Small Business ASI Agent, Loan ASI Agent, Payroll ASI Agent; connecting to the Bank or other enterprise, allowing the ASI Network to function like a Telco-Network to do billing and other service management functions such as operations, administration, maintenance and provisioning.

Bank can also decide to provide other types of services in Point-of-Service ASI Apps. For example, Bank may agree with Car dealership to allow Bank customers to purchase a car from that dealer, request a car loan from Bank, and have the entire transaction performed using ASI Apps 110, as illustrated in FIG. 7. In this instance, the transactions are not merely two-way, between the user and Bank, but three-way, amongst the consumer, Bank and Car dealership. According to one aspect of the present invention, this three-way transaction can be expanded to n-way transactions, where n represents a predetermined number of merchants or other service providers or ASI Enterprises who have agreed to cooperate to provide services to users. The present invention therefore allows for "any-to-any" communication and transactions utilizing ASI, thus facilitating a large, flexible variety of robust, real-time, bi-directional transactions using AI Superintelligence.

Bank may also decide to provide ASI intra-merchant or intra-bank services, together with the inter-merchant services described above. For example, if Bank creates an ASI Point-of-Service application for use by the Bank Payroll department, Bank may provide its own employees with a means for submitting timecards for payroll processing by the Bank's Human Resources (HR) Department. An employee selects the Bank ASI HR Point-of-Service application and submits his timecard. The employee's timecard is processed by accessing the employee's payroll information, stored in the Bank's Back Office. The transaction is thus processed in real-time, and the employee receives his paycheck immediately.

FIG. 8A, FIG. 8B and FIG. 8C show flow diagrams illustrating one embodiment of the present invention(s). In FIG. 8A, a user starts a client process in step 810. In step 812, the user connects to an ASI browser displaying ASI Apps interfacing to ASI Switch. In step 814, the user issues a request from ASI browser or AI Prompt or other user interface to use a transactional application. ASI Switch connects the user to the selected ASI App in step 816. In step 818, ASI App State Machine Protocol, ASMP executes the user's ASI request by sending to and from the ASI Stub and ASI Agent the context-specific application workflow grouped, serialized, and marshaled data structure of information entries and attributes with methods applied to the data structure over the Internet Cloud.

In FIG. 8B, the ASI Agent safely and securely retrieves data from the data repository in step 820. In step 822, the absolute values of real, accurate, dedicated absolute data become input parameters for M/L Data Set in ASI Database. Step 824 returns results to ASI Stub. Step 826 sends results to the client process.

In FIG. 8C, step 828 creates ASI Database as M/L Data Set of absolute values of real, accurate, dedicated absolute data from enterprise data. Step 830 tunes LLM parameters with the M/L Data Set of absolute values from ASI Database. Step 832 generates tokens for sequence. Step 834 returns response to ASI Request with accuracy, without hallucination or bias. Step 36 lets user continue transaction or end transaction.

FIGS. 8A, 8B, 8C show a Flow diagram illustrating one embodiment of the present invention. A two-pronged approach is shown, where a user issues a Prompt or ASI request from an ASI Browser or other user interface to use a transactional application. An Application data structure identity ASI_ID is created. The ASI Application State Machine Protocol executes the user request. The ASI_ID has a Method Name and has input arguments of information entries and attributes and generates output arguments that are absolute values that now become input parameters for M/L Data Set. So, now the M/L Data Set contains absolute values of real, accurate, dedicated absolute data, rather than from emails and off the web and social media, constituting junk data from which predictive data is currently generated in AI 1.0. Now, in AI Superintelligence aka AI 2.0, LLM Parameters are tuned utilizing this new M/L Data Set of absolute values, of real, accurate, dedicated absolute data or historical data in an Enterprise. This now generates tokens for sequence. A Prompt response of predictive values is generated. This two-pronged approach ensures accuracy, eliminates bias and gives security by accessing and invoking context-specific application workflow process automation data structures located on remote hosts.

Data is of Three Types (1) Absolute data, for example, one's account balance at any instant in time, fetched from the back-office of an enterprise;

(2) Historical Data in an enterprise;

(3) Predictive data, where the Machine Learning Data Set comes from emails, social media and the web, in other words, this data is not reliable, as it is not accurate, introduces bias and lacks security.

The present invention utilizes real, accurate, dedicated absolute data, historical data and feeds them into the M/L Data Set for predictive analysis, so that it eliminates bias, enhances security and ensures data accuracy.

ASI Application State Machine Protocol (ASMP)

ASI Application State Machine Protocol of the present invention enables a user to invoke requests in an AI Prompt or an ASI browser, which is one embodiment of the present invention or other user interface by an ASI Application data structure identity with information entries and attributes and methods, with input/output parameters, serializes them into an application-specific type, customized for an enterprise and marshals it to the ASI server or ASI Agent or interconnected ASI Agents and then returns any output parameters as absolute values to the caller/client using the ASI Application State Machine Protocol and to the Machine Learning Data Set to train and tune the LLM parameters with real, accurate, dedicated absolute data, as opposed to predictive data of AI 1.0, which lacks accuracy and security and introduces bias as the data is taken from emails, social media and the web. This ensures accuracy and security and eliminates hallucination and bias. The ASI_ID instance uniquely identifies an instantiation of the ASI_ID type.

This includes a library providing support for the application programming interfaces (APIs) to remotely access an ASI_ID ASI Application data structure, its data and its functions in an ASI_ID Application data structure network. This interface provides two types of a class, a skeleton, which is the functionality of the ASI_ID and its stub, which allows remote access of the same ASI_ID.

Detailed Description of ASI_ID—AI Superintelligence Application Data Structure Identity Glossary of terms used is provided here below.

Item is its definition.

Abstract Class is a C++ class which does not have all virtual functions defined.

Class is a C++/Java data structure definition which defines both the data and functions.

Interface is a Java term similar to the C++-Abstract Class.

Meta is a "meta"-compiler that translates a higher level "meta"-language (ASIB) from the "meta"-file into a lower-level language (C++) output file for and before giving to a traditional compiler.

ASI_ID is a C++/Java data structure instance, which is defined by a class.

ASMP of the present invention allows the user to specify functions which can be executed remotely. The basic operation uses ASI_IDs and class information, instead of simple, unrelated functions and data. The arguments to the function is specified in the meta file and whether the type of argument passing is by value or reference can also be specified.

ASMP allows for transparent remote or local operation. The programmer does not need to know whether the ASI_ID is "local" or "remote". The interface-automatically determines this and will allow for the correct operation based on the type of ASI_ID.

There are several requirements for ASMP to provide a clean and transparent operation of local and remote ASI_ID. FIG. 4B illustrates these basic requirements and operations layers of the ASI_ID ASI Application data structure layer.

- ASI_ID-AI Superintelligence Application Data Structure Identity: is needed for ASMP to determine if the ASI_ID is local (skeleton) or remote (stub). This is also needed to determine arguments and ASI_ID serialization. This feature is provided in the preferred embodiment by the ASIAppASI_ID in the asiapp.lib library. Each new class "XYZ" must add a XYZ ClassID, XYZStub_ClassID and XYZSkel_ClassID to the ASI App/ClassID.h file.
- Network Line Protocol/TCP: is needed to communicate with the remote computer. For ASMP, ASIAppRemotePDU provides this protocol data unit (PDU) and transmits the data using data serialization.
- Data Serialization: To transfer data between computers or devices, the arguments, herein the name-value pairs and the ASI_IDs themselves need to be sent over the network. This is the serialization of the data onto a network stream. The persistence nature of the framework used ensures this. The code is generated by the meta compiler in the skeleton.

Data Marshaling

To ensure that all data is passed as arguments to a method requires the user to check all arguments, herein, the name-value pairs and throw an exception, if there is something missing or wrong. This is provided by the meta compiler in the stub and skeleton.

Thread Rendezvous

To block a thread during network transmission and reception, the ASI_ID must use a different thread to perform the actual network activity and control the calling thread status. This allows calling a remote ASI_ID to behave similar to a local ASI_ID. This is performed by the framework class in the ASIAppRemotePDU class.

String Execution

This allows for a method to be called from an ASCII string representation. This is useful since it provides a simple, but unique means of calling a class method. This can also be used by the programmer directly. This data marshaling is created by the meta compiler in the base class.

Reference Counting

By maintaining reference counts in both the local and remote ASI_IDs, time consuming malloc's and free's are avoided as well as confusing details of which function is responsible for deleting which ASI_ID. This is provided by ASMP in dealing with ASIAppRemoteASI_ID types. The user cannot delete an ASIAppRemoteASI_ID child, causing an exception to be thrown, but must use the member function ASI_IDl_unreference( ). A user stores a copy of an ASIAppRemoteASI_ID child by calling the method ASI_IDl_reference( ). Otherwise, the ASI_ID may be destroyed by someone else. This interface is provided by ASIAppRemoteASI_IDInt. Abstract Base Class: To operate on an ASI_ID without knowing its location (local or remote) requires an abstract class which forms as the base class. This is the base class, which is the parent of both the stub and skeleton. This is an abstract ASI_ID (cannot be instantiated alone) and is created by the meta compiler.

Stub/Skeleton Multiple Inheritance

The client and server classes are inherited from the abstract base class and from their respective ASI_ID layer classes. This allows them to inherit the functionality of the base class as well as the ASI_ID layer routines. This is created by the meta compiler.

Meta Compiler

The Meta compiler takes a definition file and creates using encoding the above requirements: ASI_ID Identity, Data Serialization, Data Marshaling, String Execution, Abstract Base Class, and the Stub/Skeleton Multiple Inheritance. If one were to code all of this by hand for even the simplest class, there would be too many errors to even manage. The meta compiler eliminates these errors.

User-Defined Data Model

This is the user created set of classes built around and on top of ASMP APIs. This is the basis of the ASI_ID layer to the next level up the software layers. This foundation appears local to the programmers using the ASI_ID layer even though it may be remote.

Components

The programmer needs to be aware of the base class ASIAppRemoteASI_ID. There is an interface specification ASIAppRemoteASI_IDInt which is inherited by both the ASI_ID layer ASI_IDs and the data model ASI_IDs. For purposes of example, ASIAppName is a new data model ASI_ID, which contains one data member "name" which is a String. The meta compiler automatically creates two access components for this data member: get name and set name. In addition, the meta compiler also creates the local and remote versions of this data ASI_ID: ASIAppNameSkel and ASIAppNameStub, respectively.

ASIAppRemoteASI_IDInt

The abstract base class not only contains all of the member methods and data access components, but it contains support functions which provide a uniform interface to behave as an ASIAppRemoteASI_ID. This includes:

1. ASIAppStringExecution to execute any method using a simple ASCII string, and ASI_ID type data.
2. ASI_ID Lock, which provides a thread synchronization mechanism.
3. ASI_ID Flags, which provides a simple and consistent Boolean flag variables.
4. reference counts, which allow ASIAppRemoteASI_IDs to be shared without ownership concerns.
5. conversions between ASI_ID, ASIAppRemoteReference, ASIAppRemoteStub and ASIAppRemoteSkel types.

ASIAppRemoteSkel (Server)

The skeleton represents the server side of ASMP. This is a class, which is derived off the abstract base class ASIAppName and ASIAppRemoteSkel. All of the methods (except data access components) must be defined by the programmer for the skeleton since this is the actual ASI_ID. Whenever a real instance of the class is created, it will have the suffix "Skel".

ASIAppRemoteStub (Client)

This is the client (or remote) side of an ASI_ID. This is similar to the skeleton because it is derived off the abstract base class ASIAppName and an ASI_ID layer class ASIAppRemoteStub. However, there is nothing for the programmer to define for this class. All methods are generated by the meta compiler.

Meta Compiler

This is a program in the preferred embodiment, which creates the three classes: abstract base, stub and skeleton. For each class, an interface file (header file .h) and a C++ definition file (source code .cpp) is created. It will be apparent to those of ordinary skill in the art that the implementation defined here represents an implementation of the preferred embodiment. Other embodiments will be apparent such as non-TCL, non-C++ and non-Java implementations and implementations such as within a DSP chipset.

Usage

The classname is the base class (such as Account). The meta compiler created Account file must be in the same directory as other parent definitions.

ASMP files are found under ASIApp/Util. These files parse the description file and produce the six C++ output files.

Syntax

In the preferred embodiment, the syntax must be adhered to closely.

The six files are cbase, hbase, cstub, hstub, cskel or hskel.

The compiler will wait for the header section to complete. Then, begins the class name and parent, followed by the data section; and next followed by the method section, with method and arguments.

Operational Overview

The operation of this ASI_ID layer is introduced through an example.

Scenario:

Referring to FIG. 3, consider a sample financial institution in which there is a main bank ASI Application data structure ASI_ID "Fidelity" and several bank Accounts "Bob" and "Di". On the remote client side, the programmer first must establish contact with the remote server and then receive the Bank ASI_ID on the client side as a stub. Once the stub is received, the client can then look up accounts just as if the programmer was local to the skeleton on the server side. The programming code is the same on either the client or server side. The programmer does not need to know where the actual ASI_ID resides: local or remote.

ASMP Data

The programmer must first create a definition file describing the ASIAppBank and ASIAppBankAcount ASI_IDs. This is written in a simple language, which is parsed by the meta compiler of the present invention.

ASIAppBankAccount

This class contains both methods and data. The data is simply an integer describing the amount of money the account holds. The two methods: deposit and withdraw, simply increment and decrement this amount, respectively. The ASIAppBankAccountSkel.cc defines the skeleton methods. The stub methods are defined by the meta compiler.

ASIAppBank

For the Bank ASI_ID, the meta compiler will create six files: ASIAppBank.h, ASIAppBank.cpp, ASIAppBankStub.h, ASIAppBankStub.cpp, ASIAppBankSkel.h and ASI_BankSkel.cpp. These six files describe the operation and remote execution of the ASIAppBank ASI_ID. Since there is no data, there will be no data access components generated. The returned ASI_ID ASIAppBankAccount is followed by the method name, getAccount, and the arguments (name-value pairs). In this case there are two integer arguments with name id and pin. The programmer, however, must still describe any additional functionality for the operation of this ASI_ID and the definitions of the skeleton methods contained in the ASIAppBankSkel.cc file.

In this simple example, getAccount will always return Bob's account.

Example Client/Server

The client and server are simple. The server side creates the skeletons and registers them in the name server: The client program is just as simple. The major benefit demonstrated above is that the programmer does not have to know whether the ASI_ID "Bob" is local or remote.

Architecture Details

Design Considerations

Trade-offs and considerations taken into account during the creation of the ASI Application data structure ASI_ID layer are described below:

Class Overview

This section describes in more detail the function and purpose of each class in ACMP of the preferred embodiment of the present invention.

ASIAppRemoteASI_IDInt

This is the interface that all remote ASI_IDs must have. It contains several abstract class definitions, including ASI_StringExecutionInt, ASI_Lock and ASI_Flags. Plus, it defines several methods used for all remote ASI_IDs.

Unsigned get_ASI_IDl_referenceCnt( ) Const

This returns the number of pointers outstanding for this ASI_ID. If garbage collection is enabled, this ASI_ID will automatically be destroyed when the referenceCnt reaches zero.

ASIAppReferenceId get_ASI_IDl_referenceID( ) Const

This is the remote referenceId for this ASI_ID. This ASIAppReferenceId uniquely tags an ASI_ID instance on the server for the established connection. This is not a well-known name in the sense that it is not guaranteed to be the same with a different connection.

Unsigned ASI_IDl_reference( ) Const

This increments the number of references outstanding. This needs to be performed whenever a new copy of the pointer is stored.

Void ASI_IDl_unreference( ) Const

This decrements the reference count and should be called instead of delete.

ASI_ID* ASI_IDl_ASI_ID( ) Const

ASIAppRemoteStub* ASI_IDl_stub( ) Const

This will return a stub for this ASI_ID. If this ASI_ID is local, it will create a stub. If this is already a stub, it will increment the reference count.

ASIAppRemoteSkel* ASI_IDl_skel( ) Const

This will return a skeleton for this ASI_ID. If this is a skeleton, it simply increments the reference count. If this is a stub, it will create a new skeleton, copy the data and return it.

ASIAppRemoteReference* ASI_IDl_remoteReference( ) Const

This will create an ASIAppRemoteReference ASI_ID which is only used for serialization.

ASIAppRemoteASI_ID

This is the actual first level implementation of the above interface and adds String Execution to the above functions. From this ASI_ID, all of ASMP ASI_IDs are derived.

ASIAppRemoteReference

This is a type of network "pointer" which indicates where the actual skeleton ASI_ID resides.

ASIAppReferenceId referenceId

Port and host are used to uniquely specify the socket for the ASIAppRemoteConnectionServer. The referenceId is used to uniquely specify which ASI_ID on the ASIAppRemoteConnectionServer this points to. The classID is simply used to construct a local stub ASI_ID.

ASIAppRemoteStub

All stubs are derived from this ASI_ID and the abstract base ASI_ID for the class. This ASI_ID provides some interfaces to ASMP library, which is used by the meta compiler.

ASIAppRemotePDU*_ASI_IDl_execute (ASIAppRemotePDU* pdu) Const

This will block until ASI_IDl execution is finished. It will take the pre-formatted PDU.

ASIAppMarshalId_ASI_IDl_send(ASIAppRemotePDU* pdu) Const

This is a non-blocking remote execution, which returns an ASIAppMarshalId, which can be used to receive the result.

ASIAppRemotePDU*_ASI_IDl_peek(ASIAppMarshalId id) Const

This checks if the PDU id is returned from execution.

ASIAppRemotePDU* ASI_IDl_receive(ASIAppMarshalId id) Const

This blocks until the PDU is returned.

ASIAppRemoteClient*_ASI_IDl_connect( ) Const

This ensures the connection to other side is established.

ASIAppRemoteSkel

All skeletons are derived off this ASI_ID and the abstract base for the class. This ASI_ID provides the interface ASI_IDl_methodPDU( ) for the meta compiler to ASMP.

ASIAppRemotePDU

This is the actual data packet sent across the network. The data in this are:

ASIAppMarshalId Id

This is the PDU packet number. This is a monotonically increasing integer to uniquely identify the packet.

This is One of Several Known Protocol Operations:

- Disconnect—close the connection between ASIAppRemoteClient and ASIAppRemoteServer
- Error—an error occurred in processing the request
- Result—a packet containing the result of a request
- Lookup—a request to find an ASIAppRemoteReference based on a well-known name in the ASIAppRemoteNameServer
- Ping—a request for the server to send a Pong back.
- Pong—a response from the server to the client to a Ping
- Method—a request to execute the command on the server
- Unreference—a request to decrement a reference count.
- Reference—a request to increment a reference count.

An ASCII string command to execute on the remote server. This is the "name" in a Name-Value pair.

ASIAppReferenceId referenceId

This is the ASI_ID ASIAppReferenceId on the server to uniquely identify the ASI_ID of this PDU.

Vector* Data

This is the data for a method execution. This is the "value" in a Name-Value pair.

ASI_RemoteConnectionServer

This is the main class on the server side of ASMP. This is the entry point into the system for an ASIAppRemoteClient requesting access to an ASIAppRemoteServer.

ASIAppRemoteConnectionMonitor

This is the main class on the client side of ASMP. This is the entry point into the system for a connection and to create an ASIAppRemoteClient for a particular destination to the ASIAppRemoteConnectionServer.

ASIAppRemoteServer

This is server side of the client-server communication channel that processes each inbound request. The ASIAppRemoteServer will spawn a new thread for each ASIAppRemotePDU method packet. There is always one ASIAppRemoteServer for an ASIAppRemoteClient.

ASIAppRemoteClient

This is the client side of the client-server communication channel that sends each outbound request and receives the inbound response. There is always one ASIAppRemoteClient for an ASIAppRemoteServer.

ASIAppRemoteError

This is the class, which is thrown by both the client and server side whenever an error is detected. All of these are fatal and are non-recoverable.

ASIAppRemoteException

This is the class, which is thrown by both the client and server side whenever an exception is detected. None of these are fatal and the user should provide recovery code.

Timing

A timing diagram may be drawn that shows the timing between all of the ASI_IDs and the threads operating on them in the preferred embodiment. Such a timing diagram represents the startup of the ASI_ID layer on both the client and server sides. It also demonstrates a lookup ("root") call from the client and a later getname( ) method call on the root ASI_ID.

Vertical lines in such a timing diagram represent the ASI_IDs (data and functions) used in the client and server sides. Horizontal lines represent the threads in the operating system-different threads have different line patterns. There are two threads on the client side (left) and there are three on the server side (right). Also, the dotted "write" line represents TCP traffic between the two machines (client and server).

System Requirements

It will be apparent to those of ordinary skill in the art that the system items defined above represent an implementation of the preferred embodiment. Other equivalent embodiments will be apparent to those of ordinary skill in the art.

AI Superintelligence Application Service Information Base

ASIB Architecture Introduction

The present invention also includes a dynamic ASIB, the AI Superintelligence Application Service Information Base of ASMP The following sections cover an overview of the architecture for the ASIB, as the enterprise needs to be customized for each Merchant or organization. To accomplish this, a uniform interface is provided which will allow the Merchant or organization, to provide a customized interface for the business or management ASI_IDs. A library provides the core parser and interpreter for the ASIB. It also is the base class for business and management ASI_IDs, which will interface with the enterprise interface.

Architectural Overview: The architecture of a an ASI Application data structure ASI_ID in the preferred embodiment requires four parts:

1. The Extended Finite State Machine (EFSM) ASIB in the CoreBusinessASI_ID or Management ASI_ID (C++).

State is the set of values describing the current position of the machine if it has memory.

Transition is the action and state change performed by the machine after it receives an event.

Event is the inbound trigger which causes the machine to perform a transition.

Action is the output of the machine as a result of a transition.

Diagram is a complete finite state machine description containing states and transitions.

2. ASMP interface for the business or management ASI_ID to the ASIB. (C++);
3. The enterprise interface protocol (specification);
4. The ASIB instructions for the business or management ASI_ID (EISM, which stands for Enterprise Interface State Machine).

The first item (ASIB and CoreBusinessASI_ID or management ASI_ID) is built once. This is part of the ASMP library. The second item is built as a common business or other ASI_ID and should be generic enough to be configurable for different merchants or organizations. The third item is a specification that must be written by the merchant or other organization for its own enterprise interface. The fourth is configurable during runtime for different business or other organization or management ASI_IDs.

The following sections discuss the ASIB and CoreBusinessASI_ID or management ASI_ID, as well as show an example BankAccount ASI_ID which has two different merchant enterprise interfaces.

ASIB

FSM

A simple Finite State Machine (FSM) consists of two items: a set of states S and their possible transitions T. A transition t consists of an initial state ts, and event e which triggers an action a, and a final state tf. An example consists of two states S={A, B} and two transitions T={t1, t2}. The transitions can be described as t1=(A, X, Y, B) and t2=(B, U, V, A). The transition t1 from state A to state B is triggered by an event X and causes an action Y. Likewise, the transition t2 from state B to state A is triggered by an event U and causes an action V. If the finite state machine is in state A and receives any event besides X, it will remain in state A. Only when a valid event occurs (by having a defined transition) does the FSM change its state.

In a formal FSM, the set of states is indeed finite. However, often an extended FSM, called the dynamic ASIB, is needed. Here the states are not finite, per se; there exists a number of finite state "blocks" on the diagram, but there are also global variables which may store values which may take on an infinite number of possibilities. This adds another dimension to the FSM and makes the whole system have an infinite number of "states".

As an example, consider a simple counter that receives an input trigger and outputs an integer one greater than the previous output. The input event is anything. The output action is the integer "count". In the formal FSM, there would need to be a state for each possible integer value. If the counter had a limit of 10, then there would be eleven states: an initial state and one for each output value. However, if an infinite counter were needed, an infinite number of states would be needed.

However, if an extended FSM or ASIB is used, there would only need to be one state. This is the idle (or initial) state. The counter would simply output the count value and increment this value.

Interpreter

The state machine is interpreted allowing for bytecode compilation into a stack machine opcode.

Stack-Based Machine

The stack machine allows for a simple implementation and compilation of the parsed state machines.

Machine

The state machine described in the preferred embodiment uses the scheme to create an intermediate bytecode, which is interpreted by the stack machine. The ASCII input file is passed off to the parser which converts this to the byte code. The byte code can then be used to run the stack machine (as a state machine) or to the dump program which creates an ASI_ID file dump of the instructions and the symbol table.

Parser

The parser will take the input ASCII, parse it for syntax and syntactical errors, and then create a stack machine instruction set for the resulting state machine. The conversion of the state machine diagram into a stack machine saves time for the run time interpreter and does the preprocessing of the symbol table.

Interpreter

The interpreter is now just a simple stack machine, which does receive input events and sends out actions. The stack machine contains a very limited set of instructions, which simply perform the basic arithmetic and conditional chores at run time.

Core Business ASI_ID or Management ASI_ID

All business or management ASI_IDs must interface with the back-end channel to communicate with the enterprise computer. Hence, the core business or management ASI_ID, from which all of the business or management ASI_IDs derive, must have embedded in it the FSM to be able to parse the EISM ASIB configured with diagrams.

The core business or management ASI_ID must be remotely accessible and therefore must be integrated within the ASI_ID payload. It has the interfaces for the enterprise interface and the FSM. The following example illustrates the description of an example of a CoreBusinessASI_ID or Management ASI_ID.

Example Application (BankAccount)

The back-end communication channel must be customized for each customer for their given application. Since this back end channel will be different for each customer, a program capable of handling the different capabilities and customizable features per customer is needed. As illustrated below, consider a simple bank account class, which has a balance query and withdraw and deposit methods to change the account balance:

```
class BankAccount {
int balance ( ) const;
void withdraw (int amount);
void deposit (int amount);
}
```

Talking to the back-end may vary from merchant to merchant. Therefore, an intermediate machine needs to connect with the back-end to communicate using a name-value pair protocol, which is modifiable. Consider two banks, BofA and Fidelity. BofA may query the back-end for a balance of an account by sending the account number and then the word "balance: query". This can be summarized as follows:

send("account number")
send(<eid>)
send("balance: query")
expect("amount")
expect(amount)
return amount The other bank Fidelity may require the account number being set, receiving this confirmation and then send the "balance" query. This can be summarized as follows:

send("account-number")
send(<account number>)
expect(status)
send("balance")
expect(amount)
return amount The second bank Fidelity contains more steps and can have more error conditions. Both of these cases can also be described using an FSM and ASIB EISM to configure the BankAccount class.

For a single expected string, the use is straightforward. However, to use the expect state for more than one string (more than one expected response), one must make use of the "extended" nature of the ASIB EFSM. Namely, one must use global variables to store the other dimension of state. These two bank examples show how different merchant back-ends can make use of the same business or management ASI_ID.

The bank ASI_ID class structure was shown above. However, since this will be derived off of the CoreBusinessASI_ID or Management ASI_ID it follows that this BankAccount ASI_ID needs an ASMP definition, assuming these three methods: balance, withdraw and deposit:

After compiling this ASMP ASI_ID, one can then add the hooks to provide the method connections to the FSM for this particular business ASI_ID.

Thus, a method and apparatus for a thinking system using an ASI distributed Application State Machine and ASI Command, Control, Communications and Computer Intelligence (C4I) system for independent, intelligent AI Prompting and ASI Browsing, using a configurable AI Superintelligence Application Layer Switch are disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is only limited by the scope of the appended claims.

I claim:

1. An apparatus, comprising:

a memory having code therein; and circuitry configured to execute the code and implement an embedded Artificial Intelligence (AI) Superintelligence (ASI) Switch configured to connect a user-device at one end of a Boundary Quadrant to an ASI Application (App) in an ASI Apps Quadrant in a Graphical Processing Unit (GPU) or other processing unit in a data center, exchange instantiated values of user-requested action parameters with sending and receiving circuitry in an ASI Switching Quadrant, invoke an application programming interface to remotely access data and actions of a data structure of the ASI App, wherein the application programming interface provides two types of a class, wherein the two types of the class are an ASI skeleton, wherein the ASI skeleton comprises the actions of the data structure of the ASI App, and an ASI stub, wherein the ASI stub allows remote access of the same ASI App data structure;

access real, accurate, dedicated absolute data (RADAD) at the other end of the Boundary Quadrant in an end-to-end connected AI application layer network, return the real, accurate, dedicated absolute data (RADAD), train an AI-Model with the real, accurate, dedicated absolute data (RADAD) as a Machine Learning (M/L) data set, invoke a connection to an ASI Service Management Quadrant to track per usage of AI application layer network resources, apply Operations, Administration, Maintenance and Provisioning (OAM&P) services provided by the ASI Service Management Quadrant, and complete the actions in the AI application layer network.

2. The apparatus of claim 1, wherein the AI application layer network resources are provisioned, operated, administered, maintained and apportioned by providing billing per trackable unit of usage of the AI application layer network resources to enforce payment.

3. The apparatus of claim 1, wherein the AI application layer network resources include one or more of AI compute, ASI Apps, ASI App-specific action parameters, number of parameters in the AI-Model, and power and bandwidth consumption.

4. The apparatus of claim 1, wherein the application programming interface utilizes an ASI Application State Machine.

5. The apparatus of claim 1, wherein the AI-Model is a user-device specific AI-Model with ASI App-specific parameters as per a data definition file for the ASI App.

6. The apparatus of claim 1, wherein each of the ASI skeleton and the ASI stub is an ASI Agent.

7. The apparatus of claim 1, wherein the sending and receiving circuitry are ASI multi-Agents.

8. The apparatus of claim 1, wherein the ASI skeleton and ASI stub are implemented in firmware.

9. The apparatus of claim 1, wherein the AI-Model, ASI skeleton and ASI stub contain same ASI App-specific action parameters.

10. The apparatus of claim 1, wherein the AI application layer network is an Artificial General Intelligence (AGI) application layer network, or a Generative AI application layer network, or an ASI application layer network.

11. The apparatus of claim 1, wherein the OAM&P services provided by the ASI Service Management Quadrant include a tracking service that displays results in a spreadsheet or a database.

12. The apparatus of claim 1, wherein the AI-Model is an enterprise-specific ASI App-specific AI-Model or an end-user device-specific ASI App-specific AI-Model.

13. The apparatus of claim 1, wherein the ASI App is hosted on at least one of an intelligent vehicle, a drone, a robot, a watch, or a mobility device.

14. The apparatus of claim 1, wherein the ASI App is implemented at least partially in a Graphical Processing Unit (GPU) or other processing unit in a data center or in an enterprise.

15. The apparatus of claim 11, wherein the database is a Retrieval-Augmented Generation (RAG) database with embeddings of data sources, a database that retrieves text and other data with AI App state machine protocols, a database with native vector search, or a database for unstructured data.

16. The apparatus of claim 1, wherein the ASI App is user-specific to an ASI wellness App.

17. The apparatus of claim 1, wherein the ASI App is an enterprise AI App, ASI banking App, ASI military App, ASI search App, or ASI e-commerce App.

18. A method implemented by a computer-based embedded Artificial Intelligence Superintelligence (ASI) Switch, the method comprising:

connecting a user-device at one end of a Boundary Quadrant to an ASI Application (App) in an ASI Apps Quadrant in a Graphical Processing Unit (GPU) or other processing unit in a data center, exchanging instantiated values of user-requested action parameters with sending and receiving circuitry in an ASI Switching Quadrant, invoking an application programming interface to remotely access data and actions of a data structure of the ASI App, wherein the application programming interface provides two types of a class, wherein the two types of the class are an ASI skeleton, wherein the ASI skeleton comprises the actions of the data structure of the ASI Application, and an ASI stub, wherein the ASI stub allows remote access of the same ASI App data structure;

accessing real, accurate, dedicated absolute data (RADAD) at the other end of the Boundary Quadrant in an end-to-end connected AI application layer network, returning the real, accurate, dedicated absolute data (RADAD), training an AI-Model with the real, accurate, dedicated absolute data (RADAD) as the Machine Learning (M/L) data set, invoking a connection for the ASI database to an ASI Service Management Quadrant to track per usage of AI application layer network resources, applying Operations, Administration, Maintenance and Provisioning (OAM&P) services provided by the ASI Service Management Quadrant, and completing the actions in the AI application layer network.

19. A non-transitory computer-readable medium having code stored thereon that when executed by circuitry causes the circuitry to execute a method implemented by a computer-based embedded Artificial Intelligence Superintelligence (ASI) Switch, the method comprising:

connecting a user-device at one end of a Boundary Quadrant to an ASI Application (App) in an ASI Apps Quadrant in a Graphical Processing Unit (GPU) or other processing unit in a data center, exchanging instantiated values of user-requested action parameters with sending and receiving circuitry in an ASI Switching Quadrant, invoking an application programming interface to remotely access data and actions of a data structure of the ASI App, wherein the application programming interface provides two types of a class, wherein the two types of the class are an ASI skeleton, wherein the ASI skeleton comprises the actions of the data structure of the ASI Application, and an ASI stub, wherein the ASI stub allows remote access of the same ASI App data structure;

accessing real, accurate, dedicated absolute data (RADAD) at the other end of the Boundary Quadrant in an end-to-end connected AI application layer network, returning the real, accurate, dedicated absolute data (RADAD), training an AI-Model with the real, accurate, dedicated absolute data (RADAD) as the Machine Learning (M/L) data set, invoking a connection for the ASI database to an ASI Service Management Quadrant to track per usage of AI application layer network resources, applying Operations, Administration, Maintenance and Provisioning (OAM&P) services provided by the ASI Service Management Quadrant, and completing the actions in the AI application layer network.

* * * * *